United States Patent
Montross et al.

(10) Patent No.: US 11,109,642 B2
(45) Date of Patent: Sep. 7, 2021

(54) LAYERED FOAM SOLE FOR AN ARTICLE OF FOOTWEAR

(71) Applicant: REEBOK INTERNATIONAL LIMITED, London (GB)

(72) Inventors: Matthew Montross, Middleboro, MA (US); Jeff Acheson, Canton, MA (US); Dan Buonomo, Waltham, MA (US)

(73) Assignee: Reebok International Limited, London (GB)

( * ) Notice: Subject to any disclaimer, the term of this patent is extended or adjusted under 35 U.S.C. 154(b) by 49 days.

(21) Appl. No.: 16/143,991

(22) Filed: Sep. 27, 2018

(65) Prior Publication Data

US 2020/0100561 A1 Apr. 2, 2020

(51) Int. Cl.
| | |
|---|---|
| *B29D 35/00* | (2010.01) |
| *A43B 13/00* | (2006.01) |
| *B32B 37/00* | (2006.01) |
| *B29C 65/00* | (2006.01) |
| *A43B 13/12* | (2006.01) |
| *A43B 13/18* | (2006.01) |
| *B29D 35/14* | (2010.01) |
| *B32B 37/04* | (2006.01) |
| *B29C 65/02* | (2006.01) |

(52) U.S. Cl.
CPC .......... *A43B 13/127* (2013.01); *A43B 13/187* (2013.01); *A43B 13/189* (2013.01); *B29D 35/0063* (2013.01); *B29D 35/142* (2013.01); *B29C 65/02* (2013.01); *B32B 37/04* (2013.01)

(58) Field of Classification Search
None
See application file for complete search history.

(56) References Cited

U.S. PATENT DOCUMENTS

| | | | |
|---|---|---|---|
| 1,370,797 A | 3/1921 | Egerton | |
| 2,217,913 A | 10/1940 | Roy | |
| 2,456,659 A | 12/1948 | Weidner | |
| 2,673,995 A | 4/1954 | Ridderstrom | |
| D301,936 S | 7/1989 | Swett | |
| 5,258,085 A * | 11/1993 | Breitscheidel | ...... B29C 65/7437 156/148 |
| 5,430,959 A | 7/1995 | Mitsui | |

(Continued)

FOREIGN PATENT DOCUMENTS

| | | |
|---|---|---|
| EP | 0815758 B1 | 1/1998 |
| EP | 1 491 574 A1 | 12/2004 |

(Continued)

OTHER PUBLICATIONS

New C5C Rocky Army Combat Boots, DixEnterprises.wordpress. com, Posted on Feb. 5, 2014, [online],[site visited Sep. 19, 2018]. <URL: https://dixenterprises.wordpress.com/tag/c5c-rocky-boots/> (Year: 2014), 2pages /11g/ 4/23-21.

(Continued)

*Primary Examiner* — Linda L Gray
(74) *Attorney, Agent, or Firm* — Sterne, Kessler, Goldstein & Fox P.L.L.C.

(57) ABSTRACT

A method of making a midsole for an article of footwear includes forming a plurality of foam layers, arranging the plurality of foam layers in a mold to form the midsole, piercing the plurality of foam layers with pins, and introducing heat with the pins to bond the plurality of layers together.

20 Claims, 34 Drawing Sheets

(56) References Cited

U.S. PATENT DOCUMENTS

| | | | |
|---|---|---|---|
| D363,371 | S | 10/1995 | Werman |
| 5,503,786 | A | 4/1996 | Yang |
| D377,263 | S | 1/1997 | Lucas |
| D389,295 | S | 1/1998 | Kelchak |
| D390,348 | S | 2/1998 | Meyer et al. |
| D397,855 | S | 9/1998 | Clarke |
| D408,119 | S | 4/1999 | Greenberg |
| D408,977 | S | 5/1999 | Greenberg |
| D409,361 | S | 5/1999 | Greenberg |
| D417,946 | S | 12/1999 | Turner |
| D424,798 | S | 5/2000 | McDowell |
| D429,553 | S | 8/2000 | Kelchak |
| 6,129,798 | A | 10/2000 | Yang |
| D433,214 | S | 11/2000 | McDowell |
| D435,334 | S | 12/2000 | Wilson |
| 6,299,806 | B1 | 10/2001 | Chen et al. |
| D475,183 | S | 6/2003 | McClaskie |
| D487,955 | S | 4/2004 | Ammon |
| D496,152 | S | 9/2004 | Doxey |
| D508,307 | S | 8/2005 | Burg et al. |
| D516,795 | S | 3/2006 | Tresser |
| D522,735 | S | 6/2006 | Mermet |
| 7,056,459 | B2 | 6/2006 | Park |
| D530,493 | S | 10/2006 | Holmes |
| 7,313,875 | B2 | 1/2008 | Morgan |
| D570,089 | S | 6/2008 | Avar |
| D573,780 | S | 7/2008 | Davis et al. |
| D578,294 | S | 10/2008 | Mervar et al. |
| D579,186 | S | 10/2008 | Mervar et al. |
| D598,189 | S | 8/2009 | Lamont |
| D613,489 | S | 4/2010 | Horton |
| 7,797,856 | B2 | 9/2010 | Andrews et al. |
| D636,584 | S | 4/2011 | Williams, Jr. |
| D636,585 | S | 4/2011 | Williams, Jr. |
| D636,586 | S | 4/2011 | Williams, Jr. |
| D636,587 | S | 4/2011 | Williams, Jr. |
| D658,865 | S | 5/2012 | Stryjak et al. |
| D659,372 | S | 5/2012 | Stryjak et al. |
| D659,978 | S | 5/2012 | Grenet et al. |
| D659,979 | S | 5/2012 | Grenet et al. |
| D661,885 | S | 6/2012 | Williams, Jr. |
| D667,622 | S | 9/2012 | Spring |
| D670,479 | S | 11/2012 | Maier |
| D675,002 | S | 1/2013 | Marvin et al. |
| D684,757 | S | 6/2013 | Grenet et al. |
| 8,572,866 | B2 | 11/2013 | Dojan et al. |
| D708,430 | S | 7/2014 | Weeks |
| D710,586 | S | 8/2014 | Williams, Jr. |
| D712,645 | S | 9/2014 | Bove |
| D713,634 | S | 9/2014 | Shyllon |
| D715,529 | S | 10/2014 | Shyllon |
| D718,032 | S | 11/2014 | VanHook |
| D719,337 | S | 12/2014 | Miner |
| D735,454 | S | 8/2015 | Yun |
| D738,079 | S | 9/2015 | Bates et al. |
| D748,385 | S | 2/2016 | Birkinhead et al. |
| D750,882 | S | 3/2016 | Carboy |
| D753,376 | S | 4/2016 | Birkenhead |
| D778,585 | S | 2/2017 | Anceresi |
| D782,173 | S | 3/2017 | Hurayt |
| D782,174 | S | 3/2017 | Hurayt |
| 9,615,625 | B1 | 4/2017 | Huard et al. |
| D789,671 | S | 6/2017 | Chung |
| 9,681,708 | B2 | 6/2017 | Greene et al. |
| D791,450 | S | 7/2017 | Birkenhead |
| D792,690 | S | 7/2017 | Swierszczk |
| D797,425 | S | 9/2017 | Wegener |
| D798,578 | S | 10/2017 | Rémy |
| D800,437 | S | 10/2017 | McMillan |
| D801,658 | S | 11/2017 | Huard et al. |
| D801,671 | S | 11/2017 | Small |
| D802,897 | S | 11/2017 | Howe |
| D802,905 | S | 11/2017 | Chang |
| D805,282 | S | 12/2017 | Crow et al. |
| D805,288 | S | 12/2017 | Mariscal et al. |
| D805,289 | S | 12/2017 | Mariscal et al. |
| D805,754 | S | 12/2017 | Mariscal et al. |
| D807,009 | S | 1/2018 | Lee |
| D807,012 | S | 1/2018 | Shyllon |
| D809,275 | S | 2/2018 | Thornton |
| D811,069 | S | 2/2018 | Small |
| D811,715 | S | 3/2018 | Van Atta |
| D815,422 | S | 4/2018 | Hobson |
| D816,965 | S | 5/2018 | Christopherson |
| D818,254 | S | 5/2018 | Christopherson |
| D825,163 | S | 8/2018 | Montross et al. |
| D826,534 | S | 8/2018 | Ammon |
| D827,288 | S | 9/2018 | Seamarks |
| D835,392 | S | 12/2018 | Durflinger |
| D840,663 | S | 2/2019 | Flanagan et al. |
| 2004/0088888 | A1 | 5/2004 | Johnston |
| 2004/0154192 | A1 | 8/2004 | Bengtsson et al. |
| 2005/0258560 | A1 | 11/2005 | Chen et al. |
| 2006/0048413 | A1 | 3/2006 | Sokolowski et al. |
| 2007/0295451 | A1 | 12/2007 | Willis |
| 2008/0016724 | A1 | 1/2008 | Hlavac |
| 2009/0183392 | A1 | 7/2009 | Shane |
| 2011/0016746 | A1 | 1/2011 | Callahan et al. |
| 2011/0088282 | A1 | 4/2011 | Dojan et al. |
| 2011/0302810 | A1 | 12/2011 | Borel et al. |
| 2013/0303041 | A1 | 11/2013 | Kim |
| 2014/0331517 | A1 | 11/2014 | Seo |
| 2016/0066647 | A1 | 3/2016 | Handorf |
| 2018/0116337 | A1 | 5/2018 | Montross et al. |
| 2018/0338575 | A1* | 11/2018 | Elder ............... B32B 27/40 |
| 2020/0237049 | A1* | 7/2020 | Xanthos ............ A43B 13/141 |

FOREIGN PATENT DOCUMENTS

| | | |
|---|---|---|
| FR | 2995207 A1 | 3/2014 |
| WO | WO 2005/025446 A2 | 3/2005 |
| WO | WO 2015/046706 A1 | 4/2015 |

OTHER PUBLICATIONS

Solereview, "Nike Air Pegasus 31 Review," <http://www.solereview.com>, dated Jun. 10, 2014, 44pages /11g/ 4-23-21.

Reebok Floatride Run Flexweave, Reebok.com, [online],[site visited Sep. 19, 2018]. <URL: https://www.reebok.com/us/reebok-floatride-run-flexweave/CN6164.html> (Year: 2018), 1page /11g/4-23-21.

Nike Kaishi 2.0 SE VS Roshe 2 Flyknit V2, TheCrossfitShoes.com, [online],[site visited Sep. 19, 2018]. <URL: https://thecrossfitshoes.com/nike-kaishi-2-0-se-vs-roshe-2-flyknit-v2/> (Year: 2018), 9pages /11g/ 4-23-21.

* cited by examiner

LAYERED FOAM SOLE FOR AN ARTICLE OF FOOTWEAR

BACKGROUND

Field

Embodiments of the present invention relate generally to articles of footwear; and more specifically to a layered foam sole for articles of footwear and methods of making a layered foam sole.

Background

Articles of footwear protect and cushion the wearer's feet. In particular, the sole provides cushioning and support as the wearer walks, runs, or performs other activities to reduce the forces and stresses acting on the wearer. At the same time, soles should be lightweight, which can also reduce the forces and stresses acting on the wearer. Yet manufacturing shoes that meet these purposes may result in waste and other manufacturing inefficiencies. Thus, improvements in soles and their manufacturing methods are desirable.

BRIEF SUMMARY

Articles of footwear with layered foam soles and methods of manufacturing the layered foam soles are disclosed. In some embodiments, a method of making a midsole for an article of footwear includes forming a plurality of foam layers, arranging the plurality of foam layers in a mold to form the midsole, piercing the plurality of foam layers with pins, and introducing heat with the pins to bond the plurality of layers together.

In some embodiments, the plurality of foam layers comprises different types of foam. In some embodiments, the plurality of foam layers comprises polyether block amide. In some embodiments, the plurality of layers comprises horizontal layers. In some embodiments, the plurality of layers comprises vertical layers. In some embodiments, the plurality of layers alternates between a polyether block amide foam layer and an ethyl vinyl acetate foam layer. In some embodiments, the plurality of layers bonds together without an adhesive.

In some embodiments, an article of footwear includes a first polyether block amide foam layer and a second polyether block amide foam layer. In some embodiments, the first polyether block amide foam layer includes a plurality of polyether block amide foam sections bonded together without adhesive. In some embodiments, the second polyether block amide foam layer includes a plurality of polyether block amide foam sections bonded together without adhesive. In some embodiments, the first polyether block amide foam layer and the second polyether block amide foam layer are bonded together without adhesive to form at least a portion of a midsole.

In some embodiments, the plurality of polyether block amide foam sections in the first polyether block amide foam layer are arranged in series in a longitudinal direction. In some embodiments, the plurality of polyether block amide foam sections in the first polyether block amide foam layer are arranged in series in a transverse direction. In some embodiments, the first polyether block amide foam layer is longer than the second polyether block amide foam layer. In some embodiments, the article of footwear also includes a third foam layer bonded with the second polyether block amide foam layer. In some embodiments, the third foam layer comprises ethyl vinyl acetate foam. In some embodiments, the article of footwear also includes a fluid-filled bladder coupled to at least one of the first polyether block amide foam layer or the second polyether block amide foam layer.

In some embodiments, a method of making an article of footwear includes forming foam sections of different shapes, arranging the foam sections to form multi-section layers, and bonding the foam sections together in a mold without an adhesive to form a midsole for the article of footwear.

In some embodiments, forming the foam sections includes cutting the foam sections out of a sheet of polyether block amide. In some embodiments, forming the foam sections includes extruding polyether block amide. In some embodiments, the foam sections are arranged in each multi-section layer only in a longitudinal direction. In some embodiments, the foam sections are arranged in each multi-section layer only in a transverse direction. In some embodiments, shapes of two of the foam sections form an interlocking arrangement.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
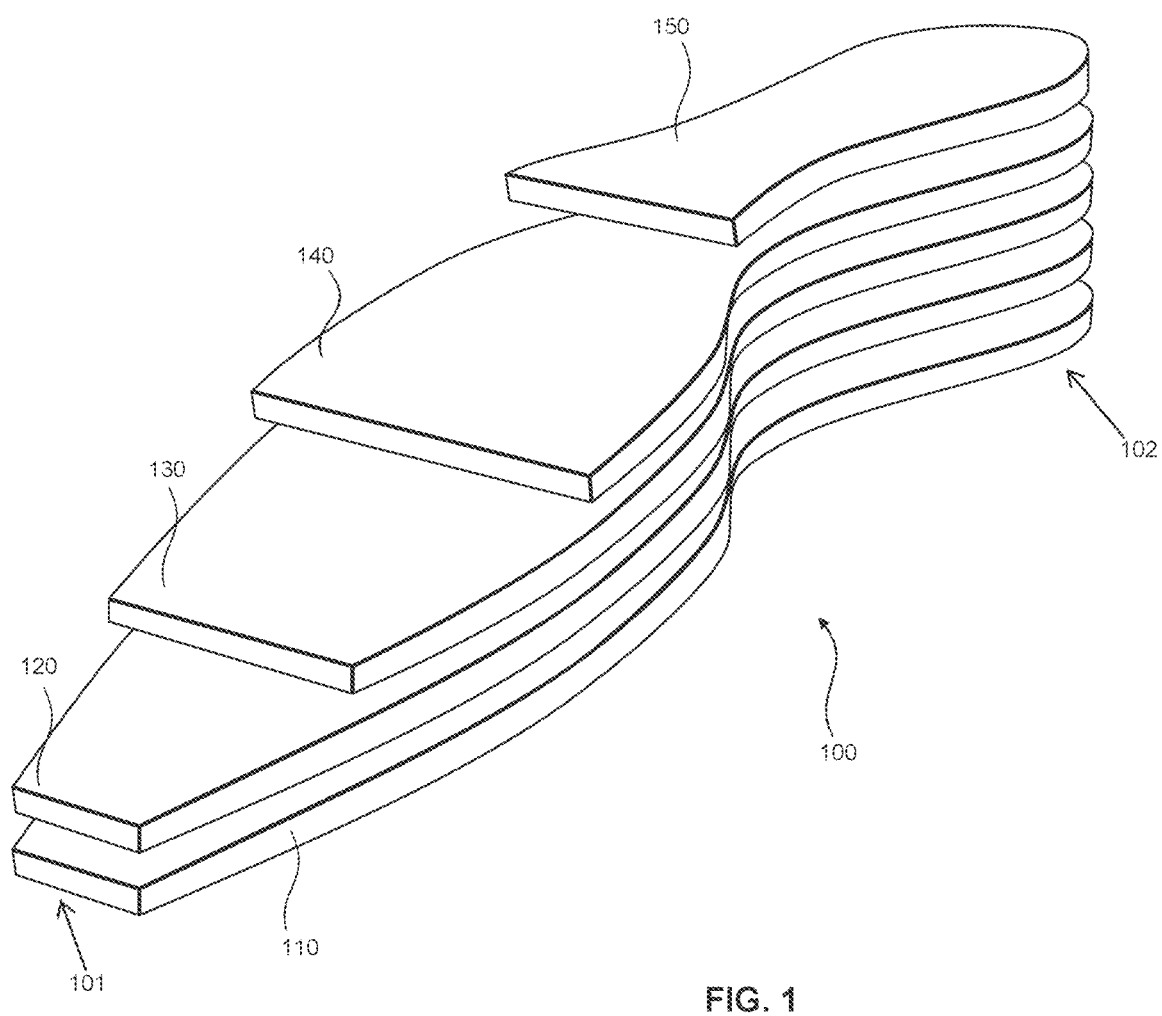
FIG. 1 shows a schematic of a layered foam sole according to some embodiments.

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Embodiments of the present invention provide a layered foam sole for an article of footwear. In some embodiments, the layered foam sole may be a midsole. In some embodiments, the midsole comprises multiple portions or sections that are molded together via, for example, compression molding. The sections may be made of polyether block amide foam, ethyl vinyl acetate foam, or other foam or non-foam material. For example, the layered foam sole may include elastomers, thermoplastic elastomers, foam-like plastics, gel-like plastics, or other materials. In some embodiments, the layered foam sole comprises sections that are made of different materials. For example, some foam sections may be polyether block amide foam and other foam sections in the layered foam sole may be ethyl vinyl acetate foam. The method of manufacturing the layered foam sole may reduce waste, thus reducing manufacturing costs and environmental impact.

In some embodiments, the sole comprises a plurality of layers. The layers may be horizontal layers (i.e., placed on top of each other) or vertical layers (i.e., placed next to each other). Each layer includes one or more foam sections. In some embodiments, the foam sections are manufactured in a manner that reduces waste. For example, the foam sections may be cut from a foam sheet in shapes that conform to the desired shape of a midsole while also reducing waste. In some embodiments, the foam sections are formed by extrusion. The layers and the foam sections may be bonded together without an adhesive, further reducing material cost and environmental impact. In some embodiments, heat is specifically introduced at the bonding interface between the layers and foam sections.

In some embodiments, the layered foam sole may use the concepts, methods, and configurations disclosed in U.S. application Ser. No. 15/336,592, filed Oct. 27, 2016, which is incorporated herein in its entirety by reference.

In some embodiments, a sole 100, as shown, for example, in FIG. 1, is formed from a plurality of layers, including first layer 110, second layer 120, third layer 130, fourth layer 140, and fifth layer 150. Sole 100 is a layered foam sole. FIG. 1 (and other figures) show layered foam soles schematically. Thus, the layers may or may not be as discrete as shown in the figures after the layered foam sole is formed. Each of layers 110, 120, 130, 140, and 150 may be a different length. In some embodiments, first layer 110 is the bottom layer and may extend from a heel end 102 of sole 100 to a toe end 101 of sole 100. In some embodiments, second layer 120 is the next layer (e.g., disposed directly above first layer 110) and may extend from heel end 102 of sole 100 to toe end 101 of sole 100. In some embodiments, second layer 120 has a length equal to the length of first layer 110. In some embodiments, second layer 120 may be slightly shorter than first layer 110. In some embodiments, third layer 130 may be disposed above second layer 120. In some embodiments, third layer 130 may be shorter than second layer 120. In some embodiments, fourth layer 140 is disposed above third layer 130. In some embodiments, fourth layer 140 may be shorter than third layer 130. In some embodiments, fifth layer 150 is disposed above fourth layer 140. In some embodiments, fifth layer 150 is the top layer. In some embodiments, fifth layer 150 may be shorter than fourth layer 140. In some embodiments, sole 100 comprises fewer or more layers than five layers (e.g., two, three, four, or six).

In some embodiments, sole 100 comprises polyether block amide foam. For example, each of first layer 110, second layer 120, third layer 130, fourth layer 140, and fifth layer 150 may comprise polyether block amide foam. In some embodiments, each layer is only polyether block amide foam. In some embodiments, each layer is primarily polyether block amide foam, but may include other materials.

In some embodiments, the layers of sole 100 may be different in one or more characteristics. For example, in some embodiments, a layer may be a different color, hardness, density, and/or material than another layer. In some embodiments, each of layers 110, 120, 130, 140, and 150 is a different color, different hardness, different density, different height, and/or different material than each other layer. In some embodiments, the color, hardness, density, height, material, etc. of layers 110, 120, 130, 140, and 150 may form a pattern (e.g., an alternating pattern). As one example, layers 110, 130, and 150 may comprise the same material as each other, such as polyether block amide foam, and layers 120 and 140 may comprise the same material as each other (but different than layers 110, 130, and 150), such as ethyl vinyl acetate foam.

Figure 2:
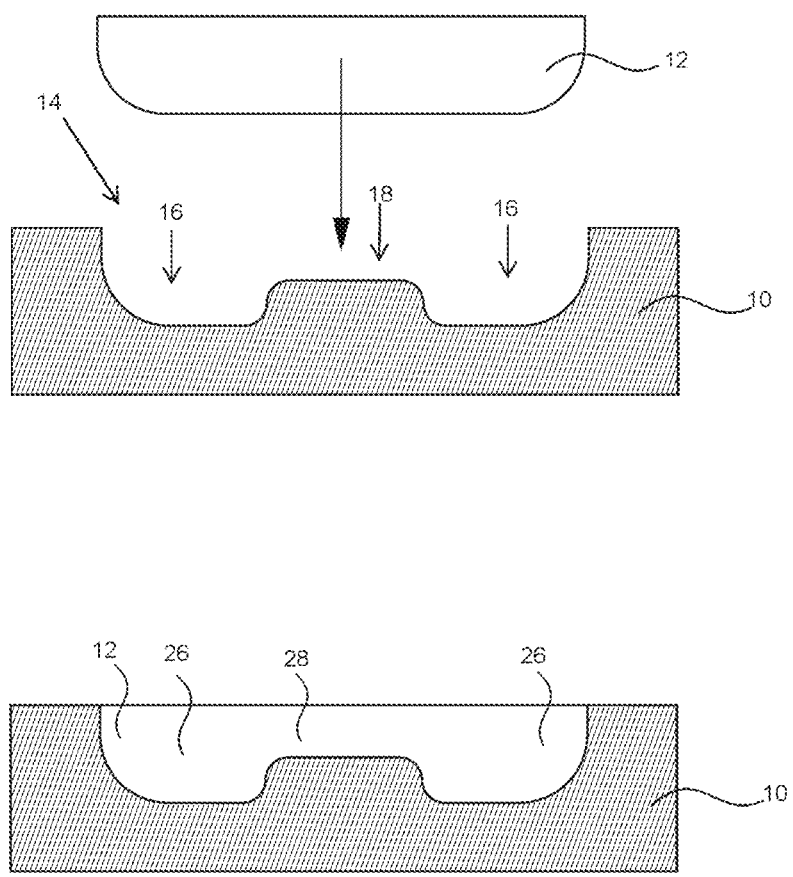
FIG. 2 shows a molding operation for processing foam to be used in a layered foam sole according to some embodiments.

In some embodiments, foams of different hardnesses and/or different densities may be joined together in a mold to form layered foam sole, such as sole 100. In some embodiments, the foam sections are processed differently to achieve different characteristics. For example, FIG. 2 illustrates a foam component 12 being processed in mold 10. Mold 10 comprises a cavity 14 configured to receive foam component 12. In some embodiments, cavity 14 comprises a first section 16 having a first depth and a second section 18 having a second depth. Because of the different depths of first section 16 and second section 18, when foam component 12 is placed in mold 10, the resulting foam includes a first portion 26 that has a different density (and/or hardness) than a second portion 28 of the foam component 12. For example, because second portion 28 has been compressed more than first portion 26, second portion 28 is more dense than first portion 26. Other processing may be used to form components of different colors, density, hardness, material, or other characteristic.

Figure 3:
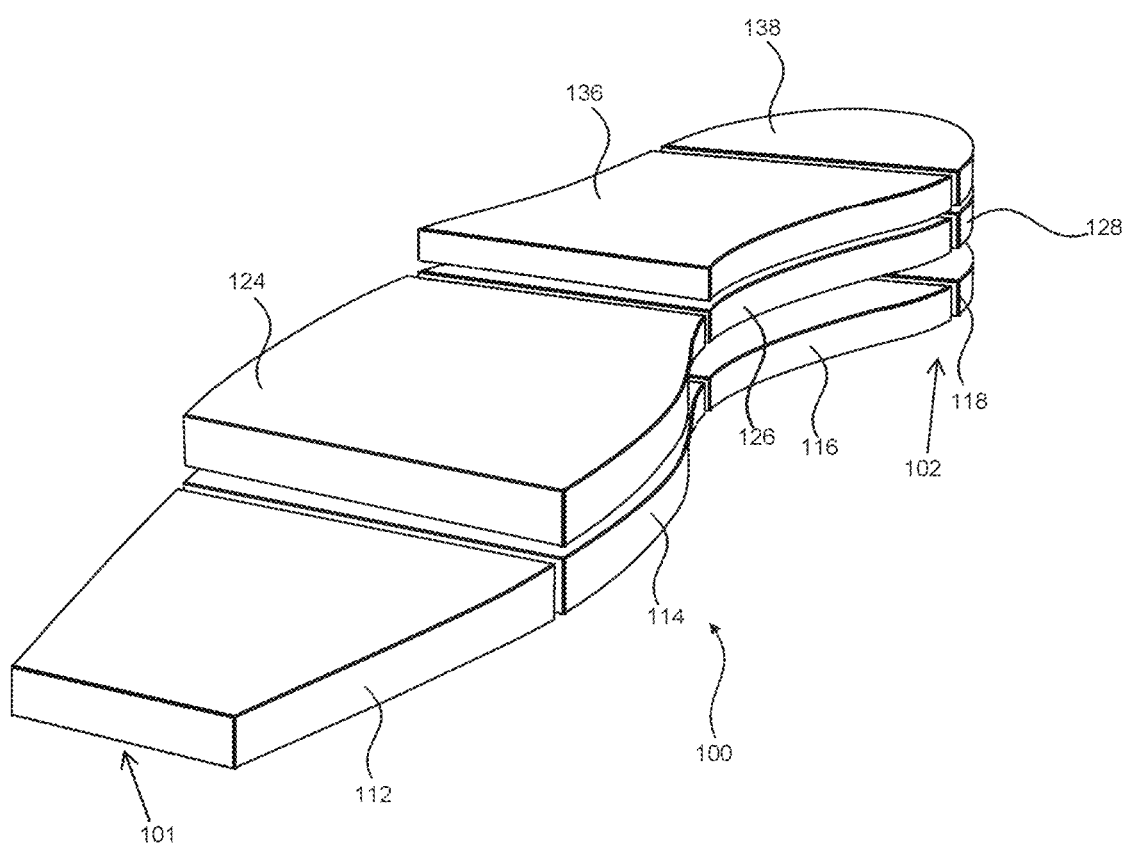
FIG. 3 shows a schematic of a layered foam sole according to some embodiments.

In some embodiments, each layer of a layered foam sole (such as sole 100) may be made of multiple foam sections. For example, as shown in FIG. 3, sole 100 comprises foam sections 112, 114, 116, and 118 that form a bottom layer of sole 100. In some embodiments, sole 100 comprises foam sections 124, 126, and 128 that form a middle layer of sole 100. In some embodiments, sole 100 comprises foam sections 136 and 138 that form a top layer of sole 100.

In some embodiments, the ends of adjacent foam sections are aligned with each other. For example, the ends of foam section 112 may align with the ends of foam section 114, the ends of foam section 114 may align with the ends of foam section 116, and the ends of foam section 116 may align with the ends of foam section 118. In some embodiments, the ends of foam sections 124, 126, and 128 of the middle layer may similarly align with each other. In some embodiments, the ends of foam sections 136 and 138 of the top layer may similarly align with each other. In some embodiments, the ends of foam section 114 may align with the ends of foam section 124. In some embodiments, the ends of foam sections 116, 126, and 128 may align with each other. In some embodiments, the ends of foam section 118, 128, and 138 may align with each other. In some embodiments, the alignment of the foam sections forms a finished final shape of sole 100. In some embodiments, the alignment may help maintain a good bond between the layers of sole 100 and/or between the foam sections.

In some embodiments, the foam sections in each layer are arranged in series in the longitudinal direction (i.e., from toe end 101 to heel end 102 or vice versa). When the foam sections are arranged in the longitudinal direction, the foam sections may extend across the entire sole in the transverse direction. This is the arrangement shown in FIG. 3. For example, the bottom layer is further shown in FIG. 4. Foam sections 112, 114, 116, and 118 are arranged in series in the longitudinal direction and each of foam sections 112, 114, 116, and 118 extend across sole 100 in the transverse direction. In some embodiments, foam sections 112, 114, 116, and 118 extend across the entire sole 100. In some embodiments, foam sole may include only a single layer (e.g., just the layer shown in FIG. 4).

Figure 4:
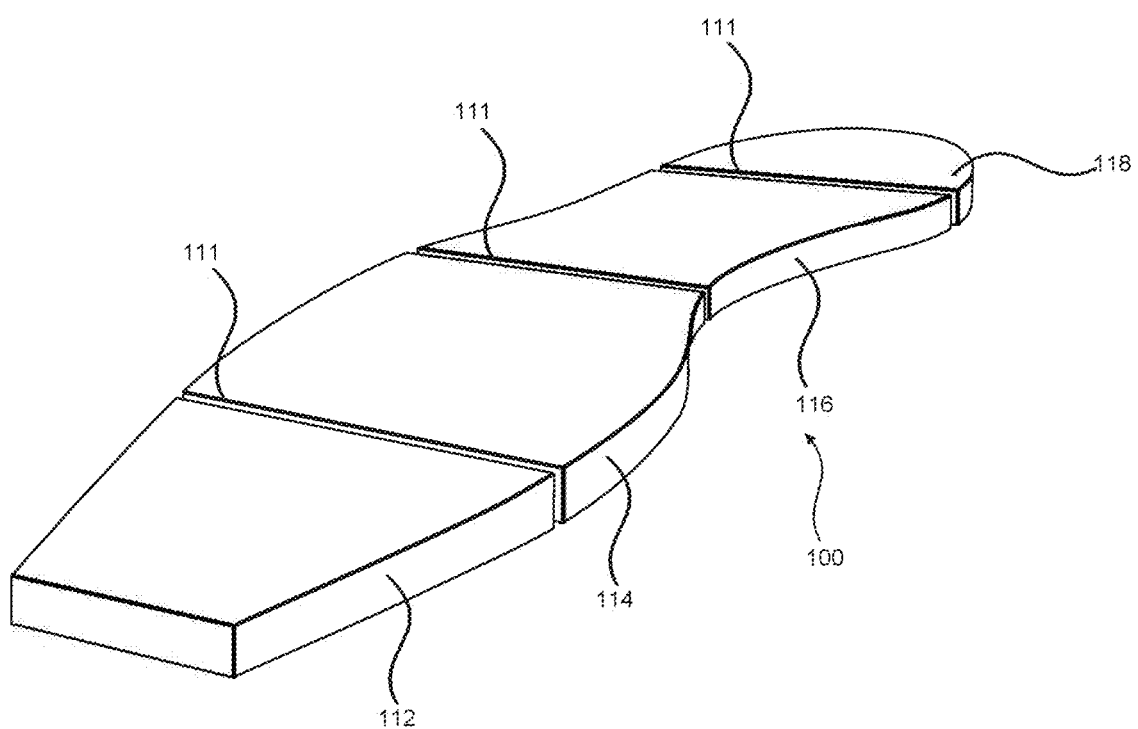
FIG. 4 shows a schematic of a layer for a layered foam sole according to some embodiments.
Figure 5:
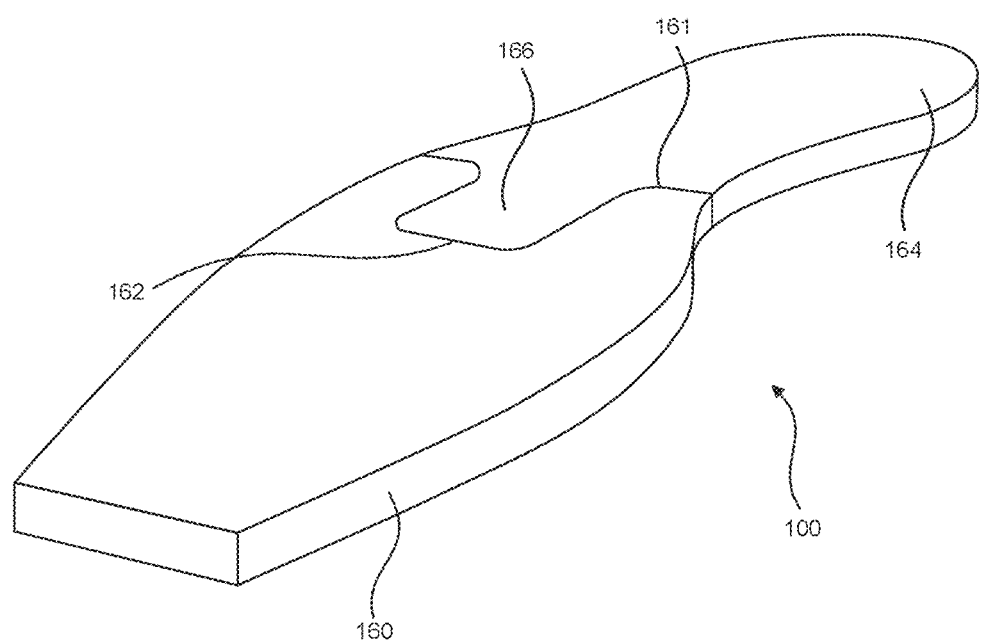
FIG. 5 shows a schematic of a layer for a layered foam sole according to some embodiments.

Because the shape of sole 100 varies longitudinally, each foam section may be a different shape. For example, each of foam sections 112, 114, 116, and 118 are a different shape. In some embodiments, as shown in FIG. 4, for example, the interface between the foam sections is flat, such as interface 111 between foam sections 112, 114, 116, and 118. In some embodiments, different shapes and interfaces may be used. For example, in some embodiments, the interface between foam sections comprises an interlocking interface or jigsaw puzzle interface. One example of an interlocking interface 161 is shown in FIG. 5, in which sole 100 comprises at least one layer with foam section 160 at the forefoot end of sole 100 and foam section 164 at the heel end of sole 100. Foam section 160 includes a recessed portion 162 and foam section 164 includes a projecting portion 166. Recessed portion 162 and projecting portion 166 fit together to form interface 161 between foam section 160 and foam section 164. In some embodiments, the forefoot foam section 160 may include the projecting portion 166, instead of the recessed portion 162.

Figure 6:
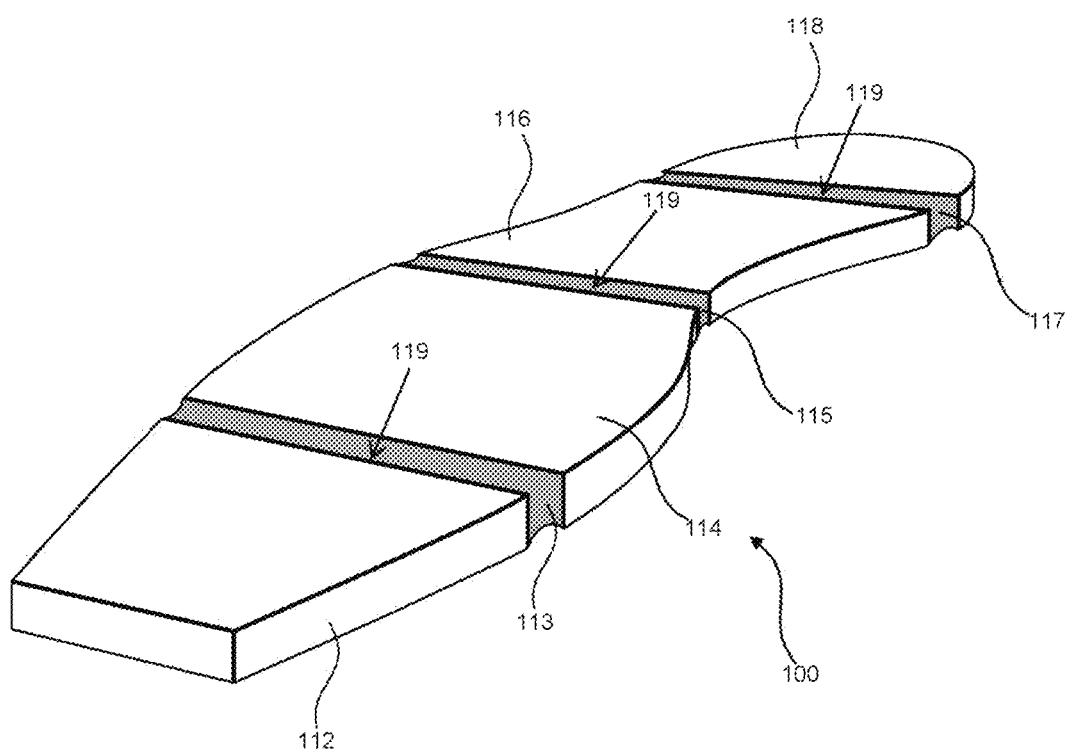
FIG. 6 shows a schematic of a layer for a layered foam sole according to some embodiments.

In some embodiments, foam sections 112, 114, 116, and 118 are not directly connected to each other. In some embodiments, sections 112, 114, 116, and 118 may each have a void or a gap 119 between them that is filled with a material that is different than the material for sections 112, 114, 116, and 118, as shown, for example, in FIG. 6. For example, fillers 113, 115, and 117 may be disposed between sections 112, 114, 116, and 118. In some embodiments, fillers 113, 115, and 117 comprises a polyurethane that may be poured between sections 112, 114, 116, and 118.

Figure 7:
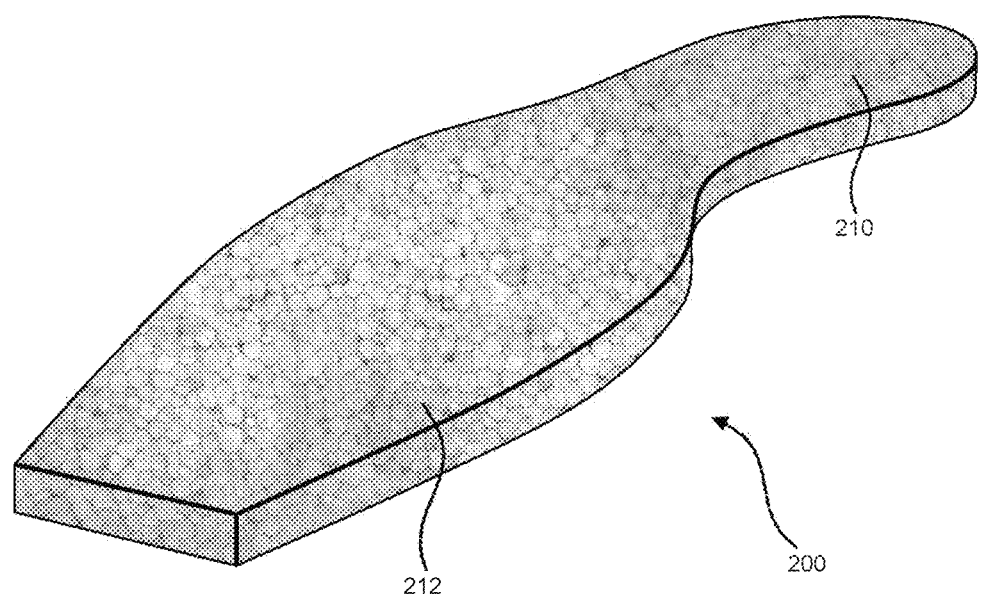
FIG. 7 shows a schematic of a layer for a layered foam sole according to some embodiments.

In some embodiments, one or more of the layers or sections comprises an expanded bead material, such as expanded polyether block amide beads fused together to form a section, or even an entire layer. For example, as shown in FIG. 7, sole 200 includes a layer 210 of expanded beads 212.

Figure 8:
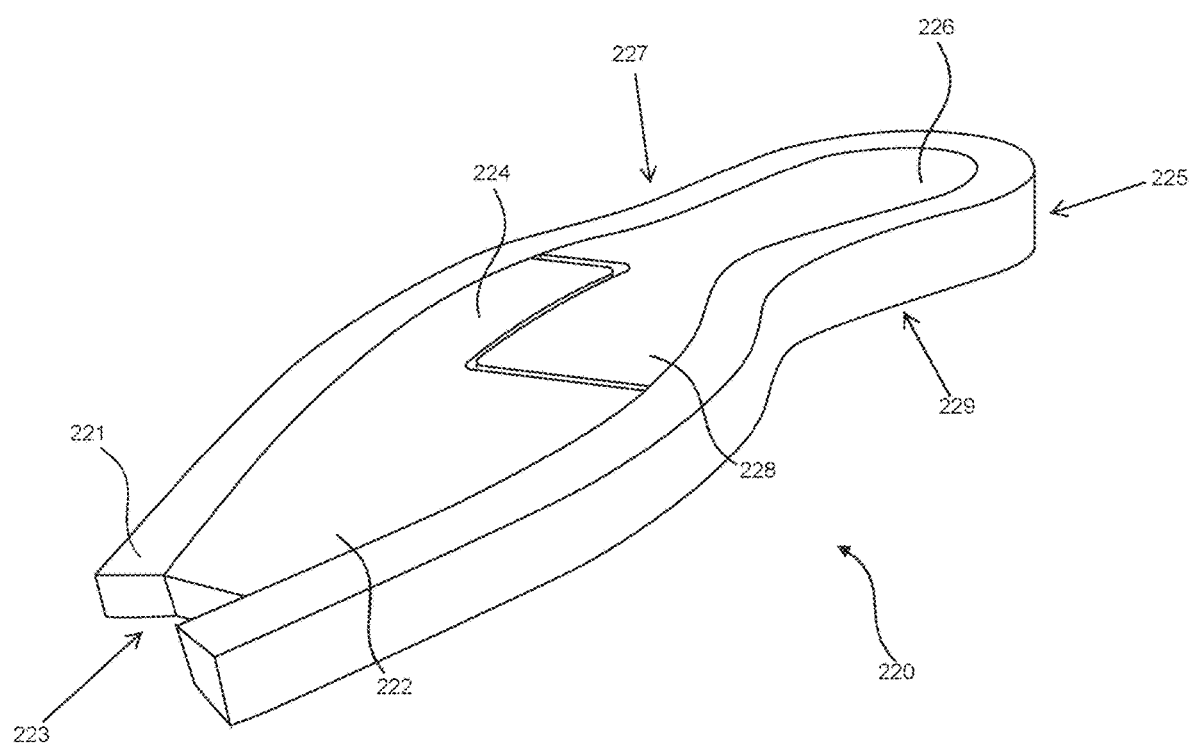
FIG. 8 shows a schematic of a layer for a layered foam sole with a rim according to some embodiments.

One or more layers may include an outer rim surrounding the other sections. FIG. 8, for example, shows a sole 220 that includes a section 222 in a forefoot end 223 of sole 220 and a section 226 in a heel end 225 of sole 220 with a rim 221 surrounding section 222 and section 226. In some embodiments, section 222 comprises a projection 224 on a lateral side 227 of sole 220 and section 226 comprises a projection 228 on a medial side 229 of sole 220. Projections 224 and 228 interface with each other to form a layer of sole 220.

Figure 9:
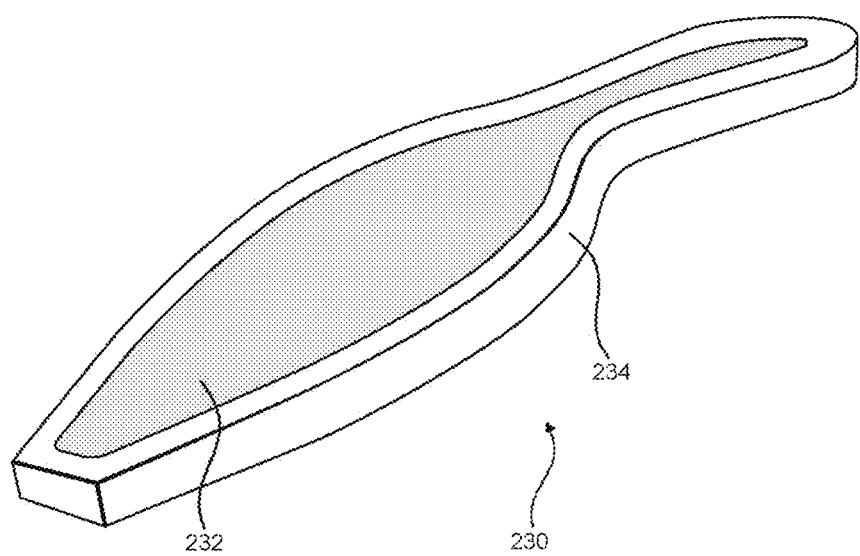
FIG. 9 shows a schematic of a layer for a layered foam sole with a rim according to some embodiments.

In some embodiments, a sole 230 comprises a core 232 and a rim 234, as shown, for example, in FIG. 9. In some embodiments, core 232 comprises polyether block amide. In some embodiments, rim 234 comprises polyether block amide. In some embodiments, both core 232 and rim 234 comprise polyether block amide.

Figure 10:
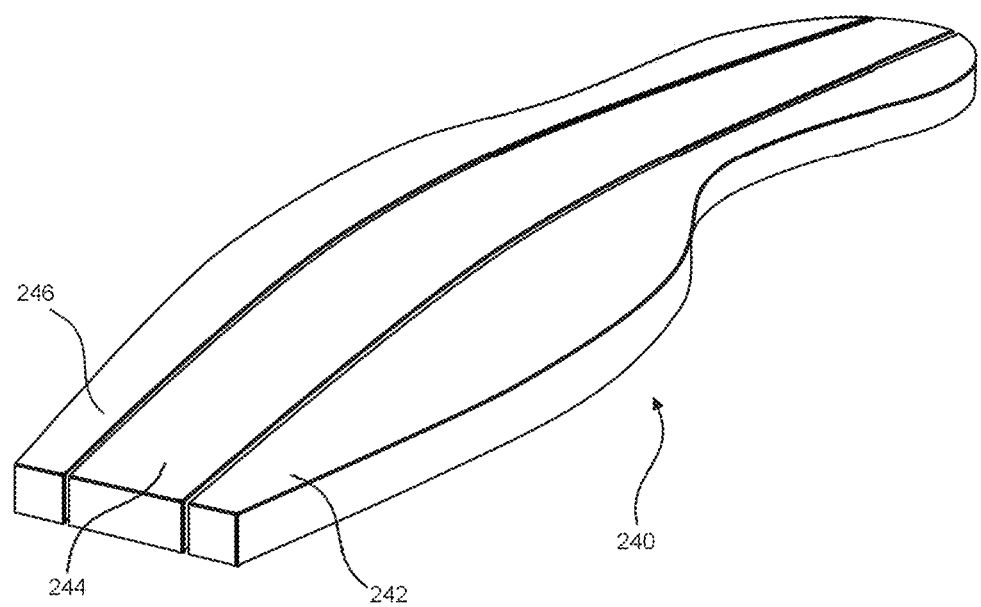
FIG. 10 shows a schematic of a layer for a layered foam sole according to some embodiments.
Figure 11:
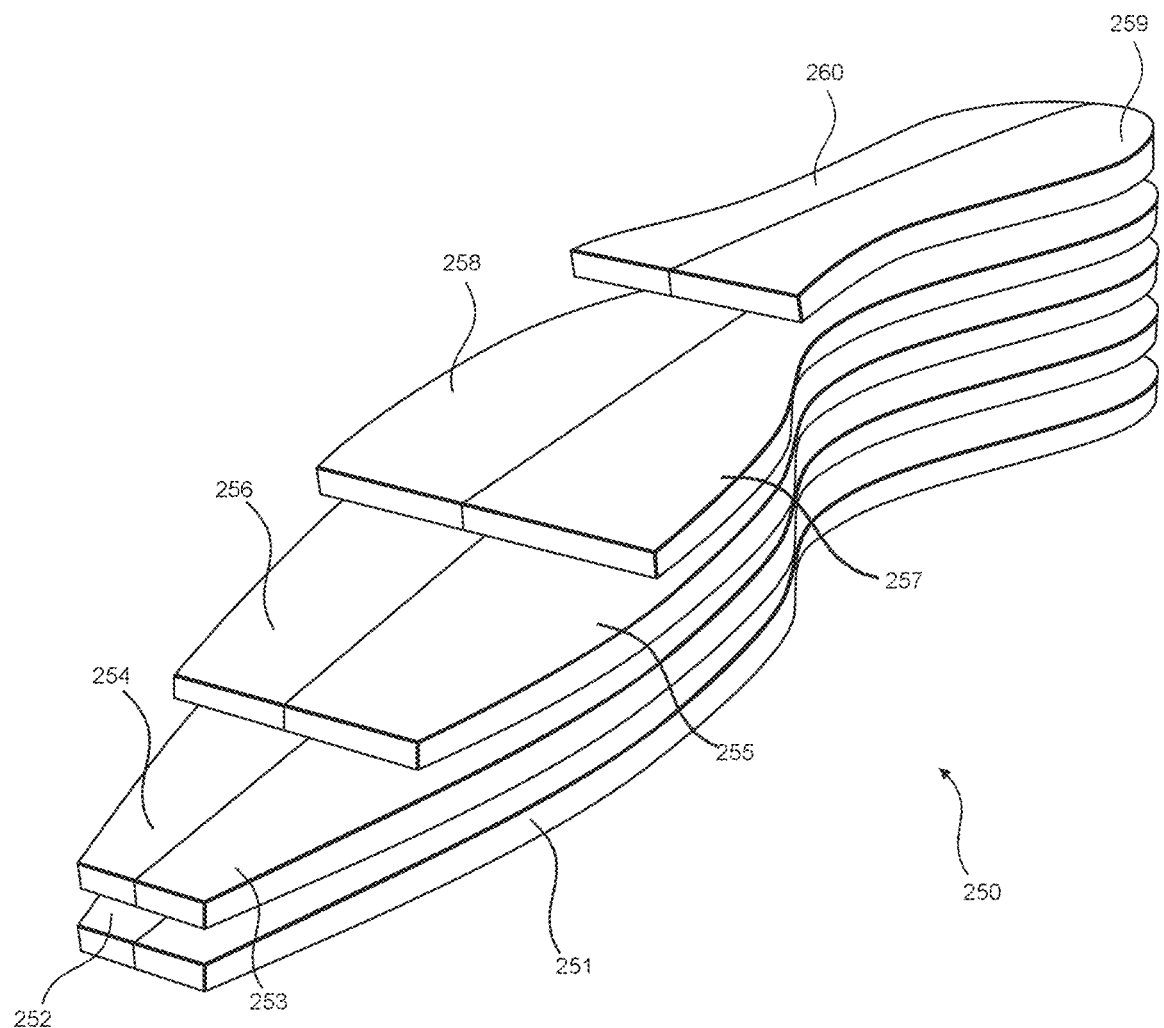
FIG. 11 shows a schematic of a layered foam sole according to some embodiments.

In some embodiments, a sole 240 may include a layer that comprises foam sections arranged in series in the transverse direction (i.e., from a medial side to a lateral side or vice versa), as shown, for example, in FIG. 10. When the foam sections are arranged in the transverse direction, the foam sections may extend across the entire sole in the longitudinal direction, as shown, for example, in FIG. 10. Foam sections 242, 244, and 246 are arranged in the transverse direction and each of foam sections 242, 244, and 246 extend across sole 240 in the longitudinal direction. In some embodiments, foam sections 242, 244, and 246 extend across the entire sole 240 in the longitudinal direction. In some embodiments, each layer of a layered foam sole (such as sole 100) may be made of foam sections that are arranged in the transverse direction. For example, as shown in FIG. 11, a sole 250 comprises foam sections 251 and 252 that form a bottom layer of sole 250, foam sections 253 and 254 that form the next layer of sole 250, foam sections 255 and 256 that form a middle layer of sole 250, foam sections 257 and 258 that form the next layer of sole 250, and foam sections 259 and 260 that form a top layer of sole 250. In some embodiments, the foam sections in each layer (i.e., foam sections 251-260 are arranged in the transverse direction (i.e., from a medial edge to a lateral edge or vice versa).

Figure 12:
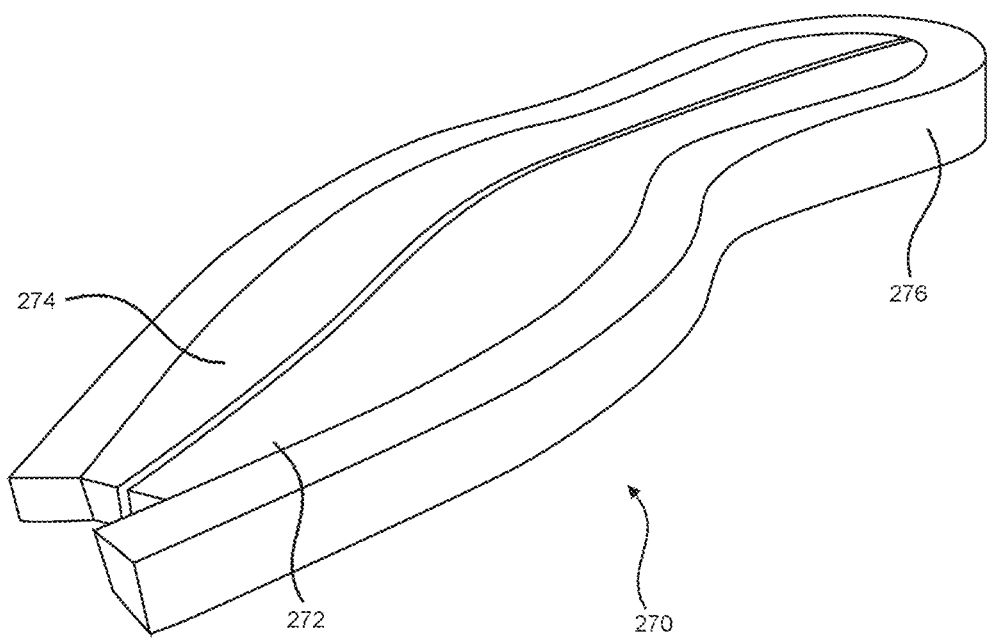
FIG. 12 shows a schematic of a layer for a layered foam sole with a rim according to some embodiments.

As with other soles and layers discussed herein, layers or soles with foam sections arranged in a transverse direction may be surrounded by a rim. For example, a sole 270 is shown in FIG. 12 with foam sections 272 and 274 that are arranged in the transverse direction and extend in the longitudinal direction. A rim 276 surrounds foam sections 272 and 274.

Figure 13:
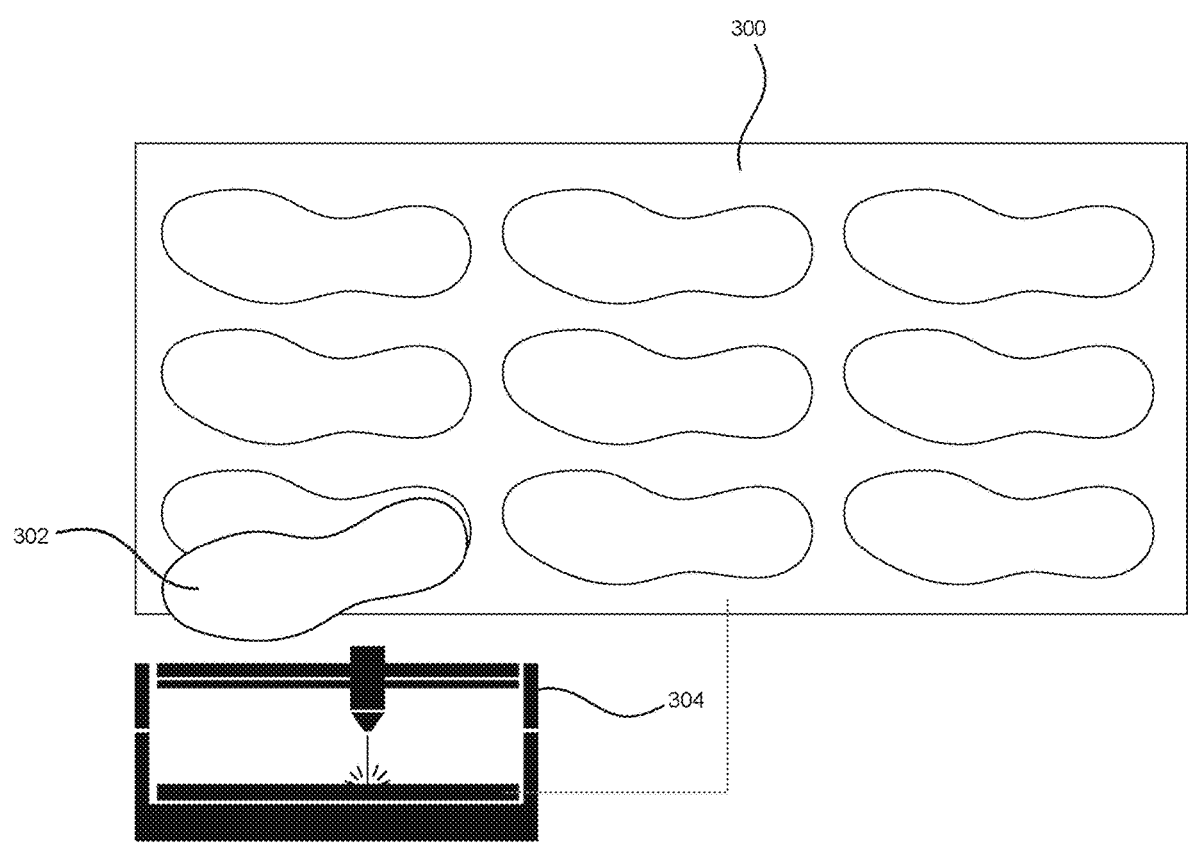
FIG. 13 shows a cutting operation for processing foam to be used in a layered foam sole according to some embodiments.
Figure 14:
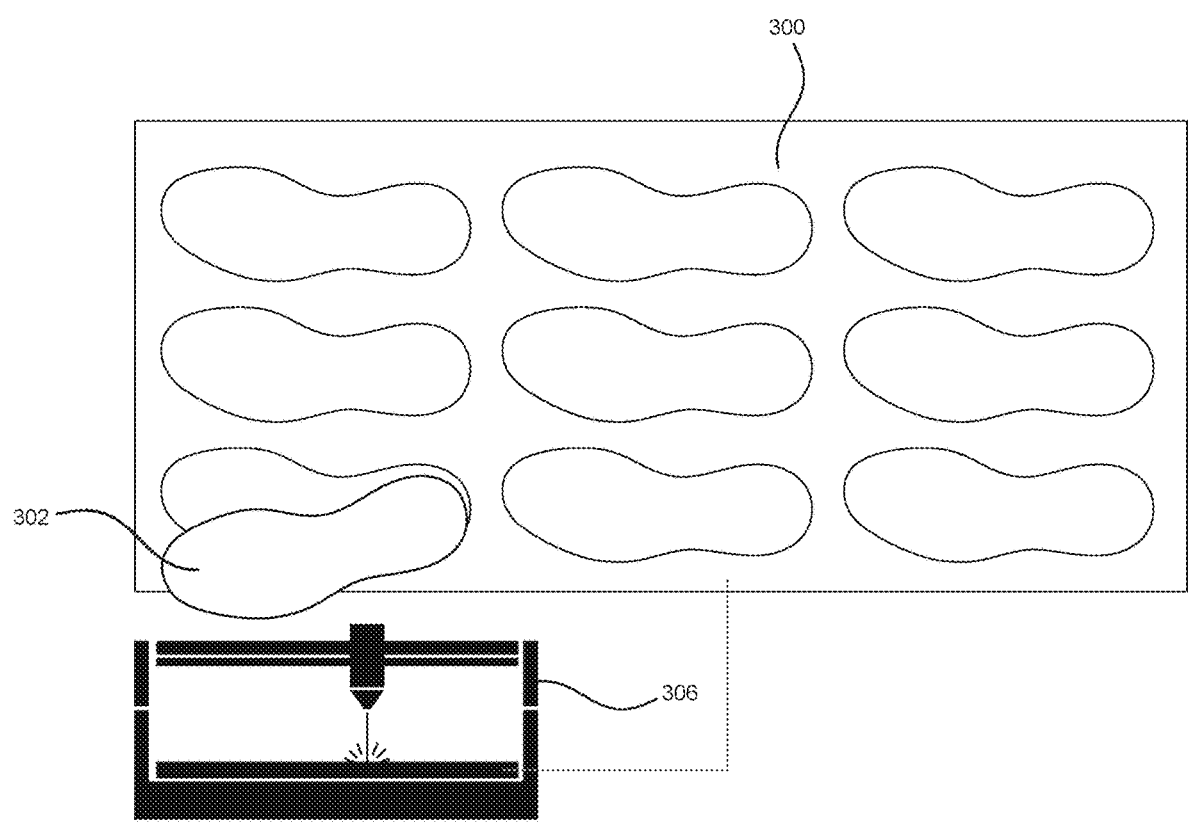
FIG. 14 shows a cutting operation for processing foam to be used in a layered foam sole according to some embodiments.

As noted above, each foam section may comprise a different shape. Foam sections may be formed in various ways. In some embodiments, foam sections are cut from a sheet of material, such as a sheet of polyether block amide foam. For example, as shown in FIGS. 13 and 14, a foam section 302 may be cut from sheet 300. Although foam section 302 shows a shape of an entire sole, foam section 302 may be any shape. In some embodiments, a variety of shapes may be cut from a single sheet 300. The foam sections 302 are cut out in a manner that maximizes the percentage of sheet 300 that is used for a foam section 302, thus reducing the amount of waste from the cutting process. In some embodiments, foam sections 302 are cut with a laser cutter 304, as shown in FIG. 13. In some embodiments, foam sections 302 are cut with a water jet cutter 306, as shown in FIG. 14.

Figure 15:
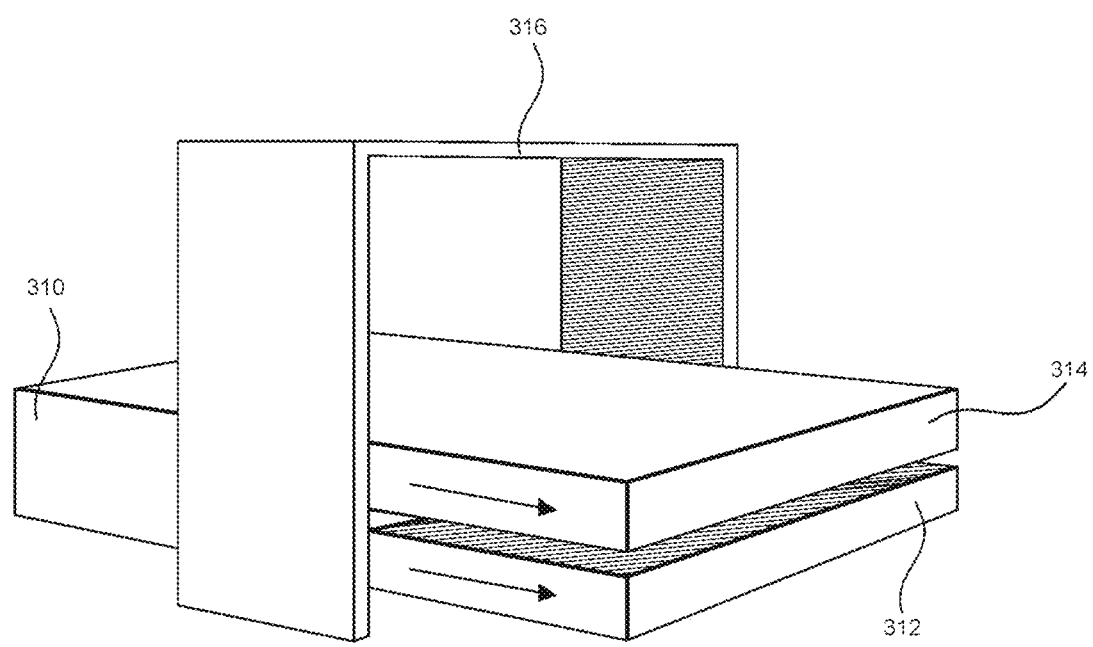
FIG. 15 shows a cutting operation for processing foam to be used in a layered foam sole according to some embodiments.
Figure 16:
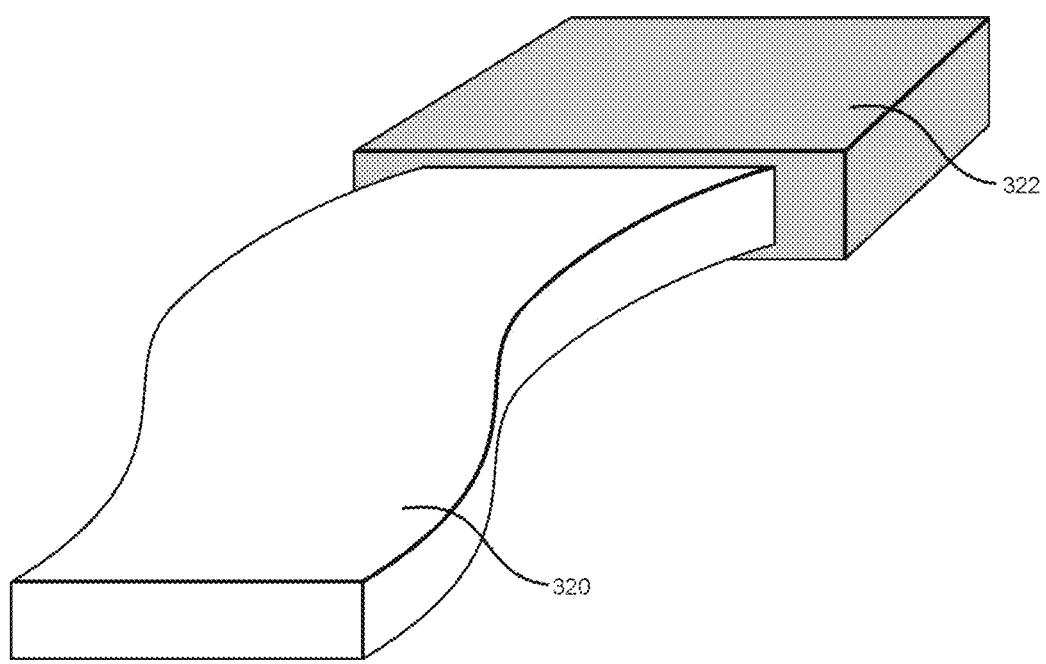
FIG. 16 shows an extruding operation for processing foam to be used in a layered foam sole according to some embodiments.

In some embodiments, foam sections are formed by cutting a block lengthwise. For example, as shown in FIG. 15, a foam block 310 may be cut into two foam sheets 312 and 314 with a skiver 316. Foam block 310 (and thus foam sheets 312 and 314) may comprise polyether block amide foam. In some embodiments, foam sheet 312 has a different height than foam sheet 314. In some embodiments, foam sections are formed by extrusion. For example, as shown in FIG. 16, foam section 320 is formed by an extruder 322. In some embodiments, a combination of these processes may be used to form foam sections. For example, foam sheets 312 and 314 may be formed by skiving, followed by a laser cutting process or water jet cutting process to form foam sections for use in a layered foam sole.

Figure 17:
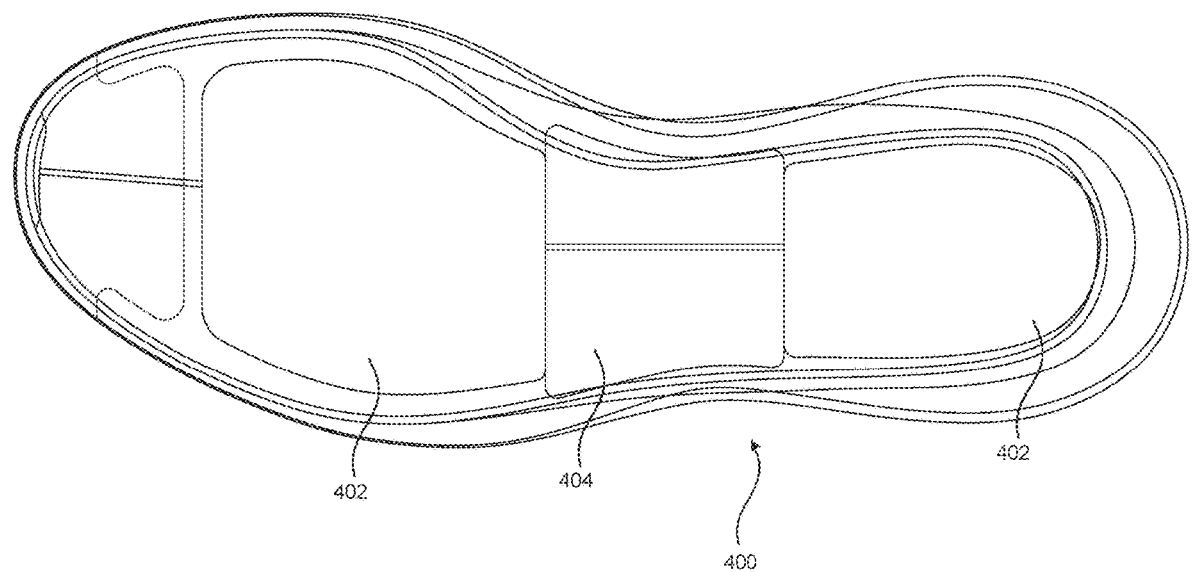
FIG. 17 shows a schematic of a layered foam sole according to some embodiments.

Foam sections may be made of different foam materials. In some embodiments, for example, a foam layer for a sole comprises foam sections of different types of foam. As shown in FIG. 17, sole 400 comprises at least two foam sections 402 made of polyether block amide and at least one foam section 404 made of ethyl vinyl acetate foam.

Figure 18:
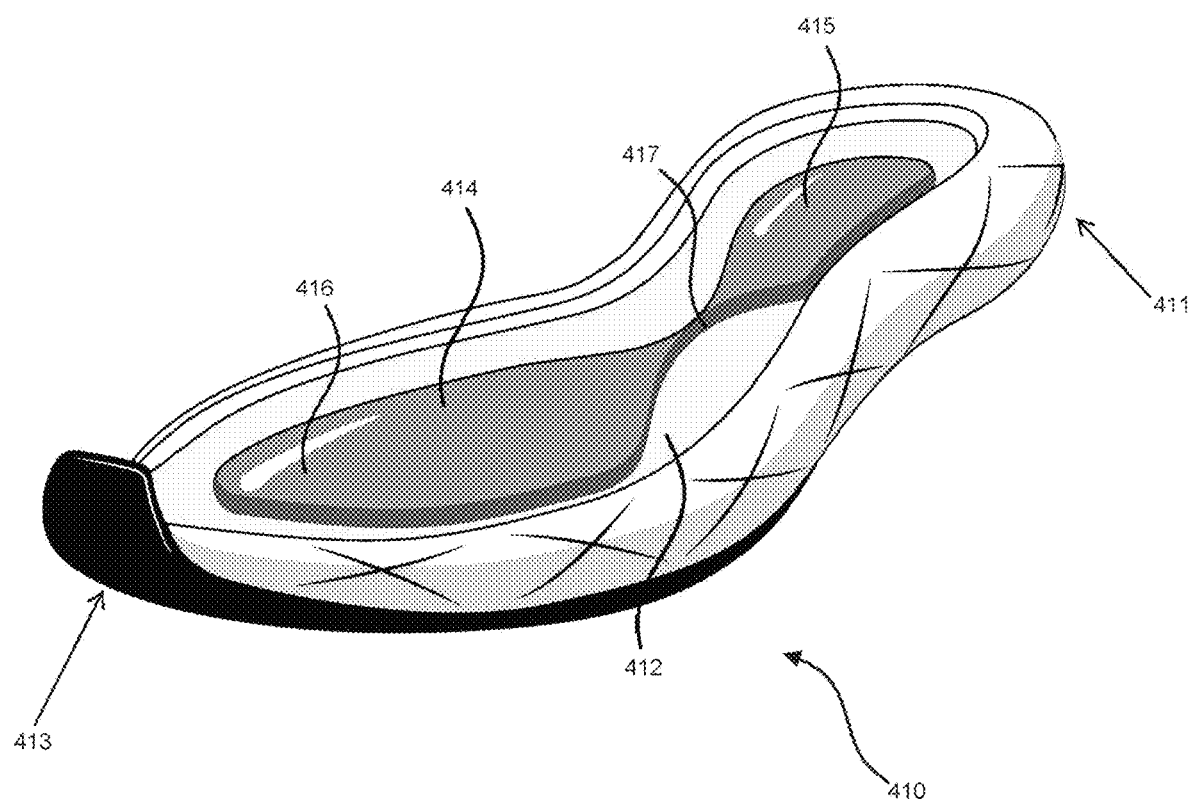
FIG. 18 shows a schematic of a layered foam sole according to some embodiments.

Layered foam soles may also incorporate other components. In some embodiments, as shown, for example, in FIG. 18, a sole 410 comprises a layered foam portion 412 and a fluid-filled bladder 414. For example, a fluid-filled bladder 414 may be coupled to layered foam portion 412 made of polyether block amide foam. In some embodiments, fluid-filled bladder 414 is disposed on top of layered foam portion 412. In some embodiments, fluid-filled bladder 414 may be surrounded by layered foam portion 412. In some embodiments, fluid-filled bladder 414 is disposed underneath layered foam portion 412. Fluid-filled bladder 414 may comprise a network of fluid-filled bladders. For example, fluid-filled bladder 414 may comprise a rear bladder 415 disposed in the heel 411 of sole 410 and a forward bladder 416 disposed in the forefoot 413 of sole 410 with rear bladder 415 and forward bladder 416 connected to each other with a fluid passageway 417. In some embodiments, sole 410 comprises multiple fluid-filled bladders 414 that may or may not be fluidly connected to each other. Multiple configurations of fluid-filled bladders 414 are possible. In some embodiments, fluid-filled bladder 414 is filled with air. In some embodiments, the air is pressurized. Various pressures of the air in fluid-filled bladder 414 may be used based on the desired cushioning. In some embodiments, a fluid that is more viscous than air may be used. In some embodiments, fluid-filled bladder 414 compliments the cushioning elements of layered foam portion 412. In some embodiments, fluid-filled bladder 414 is pre-filled. In some embodiments, fluid-filled bladder 414 includes an access port for secondary loading or charging, which may allow for more customization (e.g., the user may adjust the amount of fluid in fluid-filled bladder 414).

Figure 19:
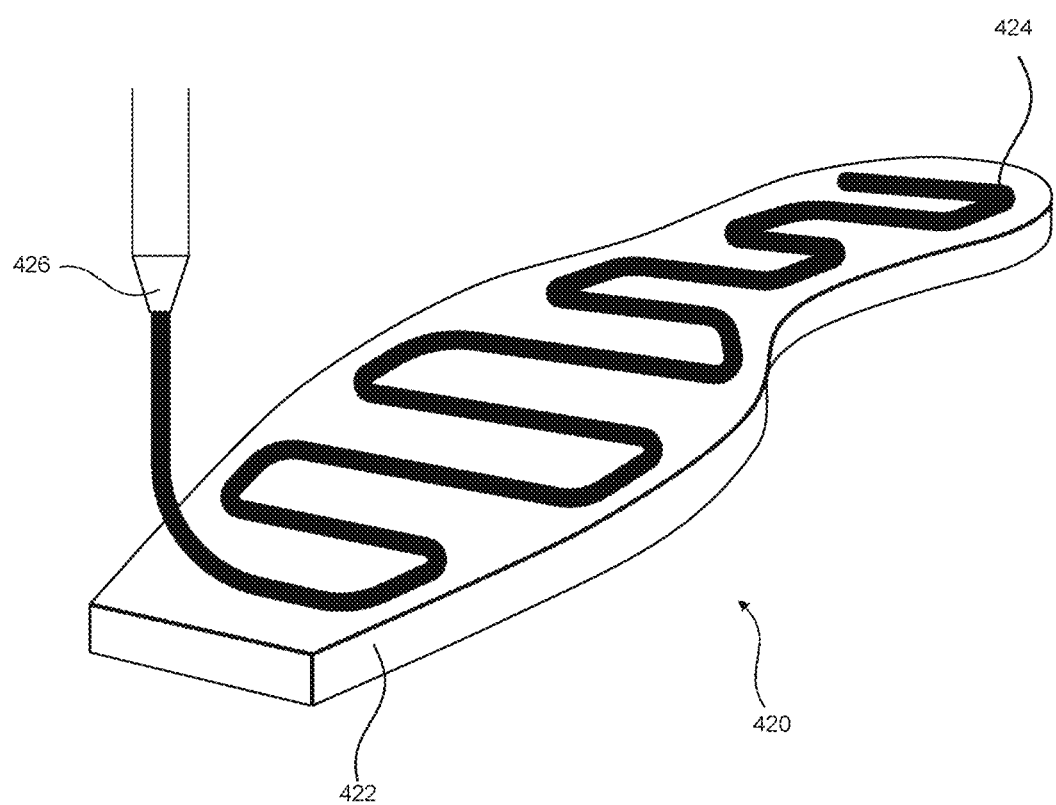
FIG. 19 shows a schematic of a layered foam sole according to some embodiments.

In some embodiments, as shown, for example, in FIG. 19, a sole 420 comprises a layered foam portion 422 and a dispensed component 424. Dispensed component 424 may be dispensed onto layered foam portion 422 from nozzle 426. In some embodiments, dispensed component 424 forms an outsole for sole 420. Dispensed component 424 may be dispensed in a controlled geometric pattern onto a bottom surface of layered foam portion 422. In some embodiments, dispensed component 424 may be dispensed at an interface between two sections of a foam layer. In some embodiments, dispensed component 424 may be dispensed between two layers.

In some embodiments, other material may be coupled with a layered foam sole

Figure 20:
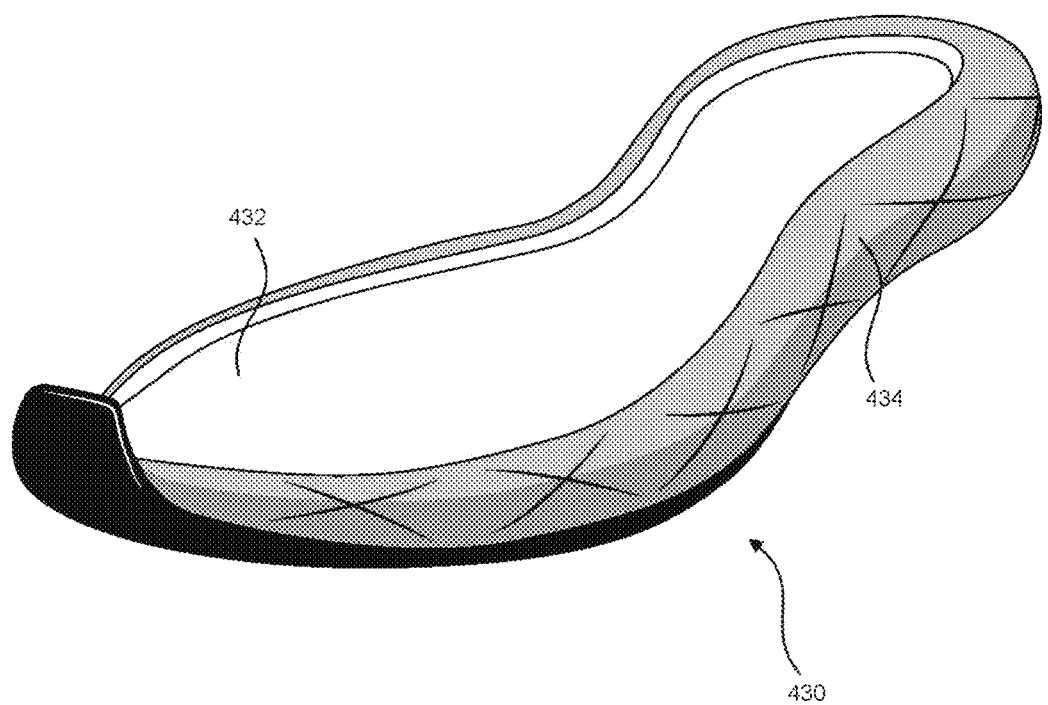
FIG. 20 shows a schematic of a layered foam sole according to some embodiments.
Figure 21:
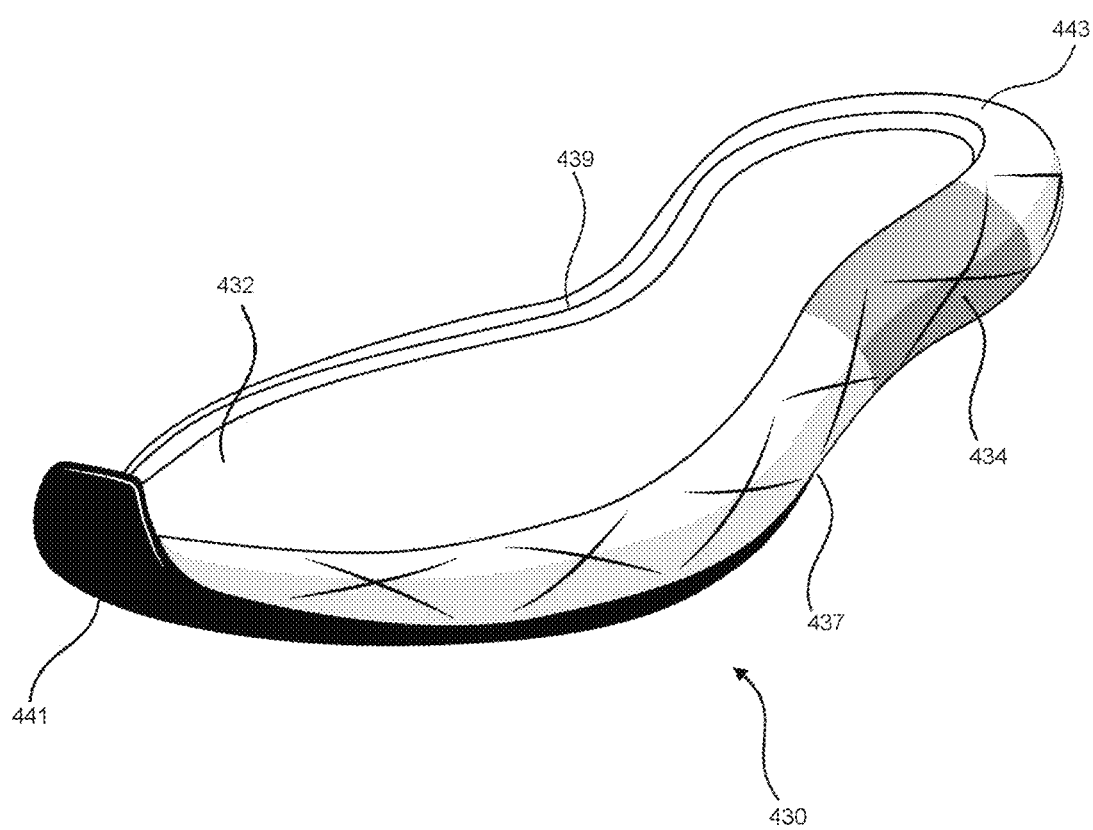
FIG. 21 shows a schematic of a layered foam sole according to some embodiments.
Figure 22:
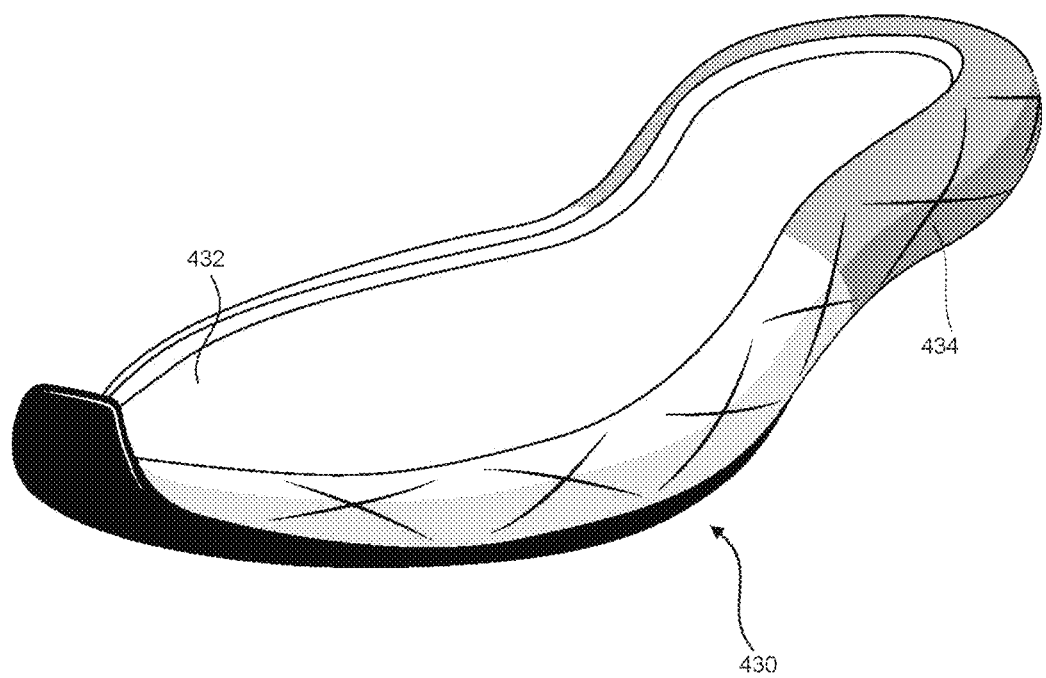
FIG. 22 shows a schematic of a layered foam sole according to some embodiments.

In some embodiments, additional components may be disposed around an outer edge of layered foam sole. As shown, for example, in FIG. 20, a sole 430 comprises a layered foam portion 432. Layered foam portion 432 may apply the principles discussed above. For example, layered foam portion 432 may include horizontal layers (see FIG. 1) and/or vertical layers (see, for example, FIGS. 3-6, 10-12). In some embodiments, layered foam portion 432 is surrounded by a thermoplastic polyurethane wrap 434. In some embodiments, wrap 434 completely surrounds layered foam portion 432, as shown in FIG. 20. In some embodiments, wrap 434 is only disposed in a particular area around layered foam portion 432, as shown in FIG. 21. For example, wrap 434 may be disposed on a lateral side 437 of sole 430 (see FIG. 21), a medial side 439 of sole 430, a forefoot 441 of sole 430, and/or a heel 443 of sole 430 (see FIG. 21). In some embodiments, wrap 434 surrounds half of layered foam portion 432, as shown in FIG. 22. For example, wrap 434 may surround heel 443 of sole 430.

Figure 23:
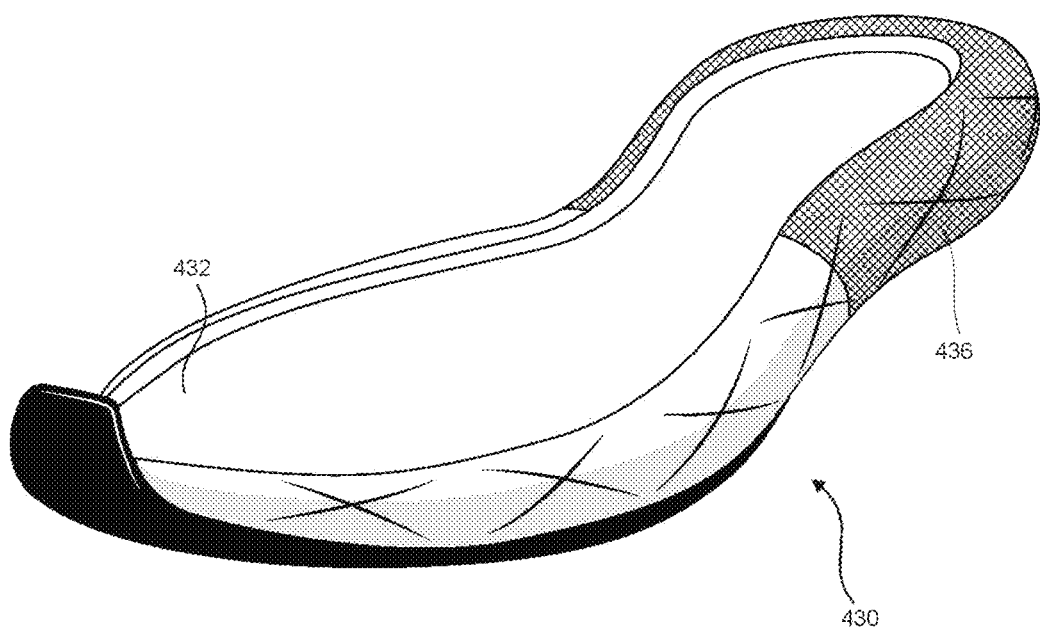
FIG. 23 shows a schematic of a layered foam sole according to some embodiments.
Figure 24:
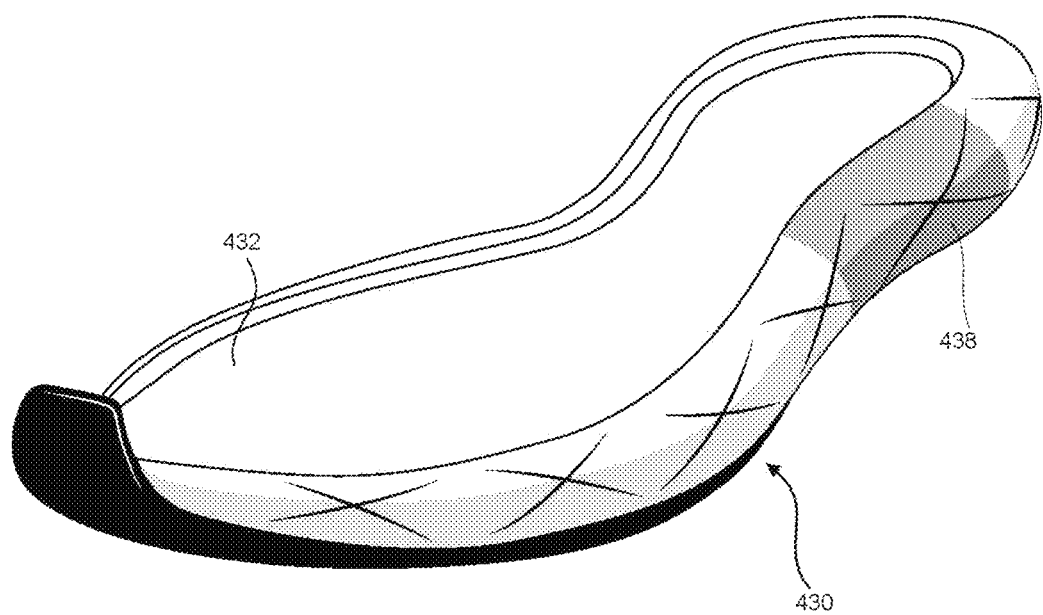
FIG. 24 shows a schematic of a layered foam sole according to some embodiments.

In some embodiments, other material is used instead of thermoplastic polyurethane. For example, In some embodiments, a material textile wrap 436 is used, as shown in FIG. 23. Although FIG. 23 shows material textile wrap 436 surround half of layered foam portion 432 (i.e., in the heel 443 of sole 430), material textile wrap 436 may be disposed in other locations, similar to wrap 434. In some embodiments, a paint 438 is applied around layered foam portion 432, as shown in FIG. 24. Paint 438 may also be disposed in other locations, similar to wrap 434.

Figure 25:
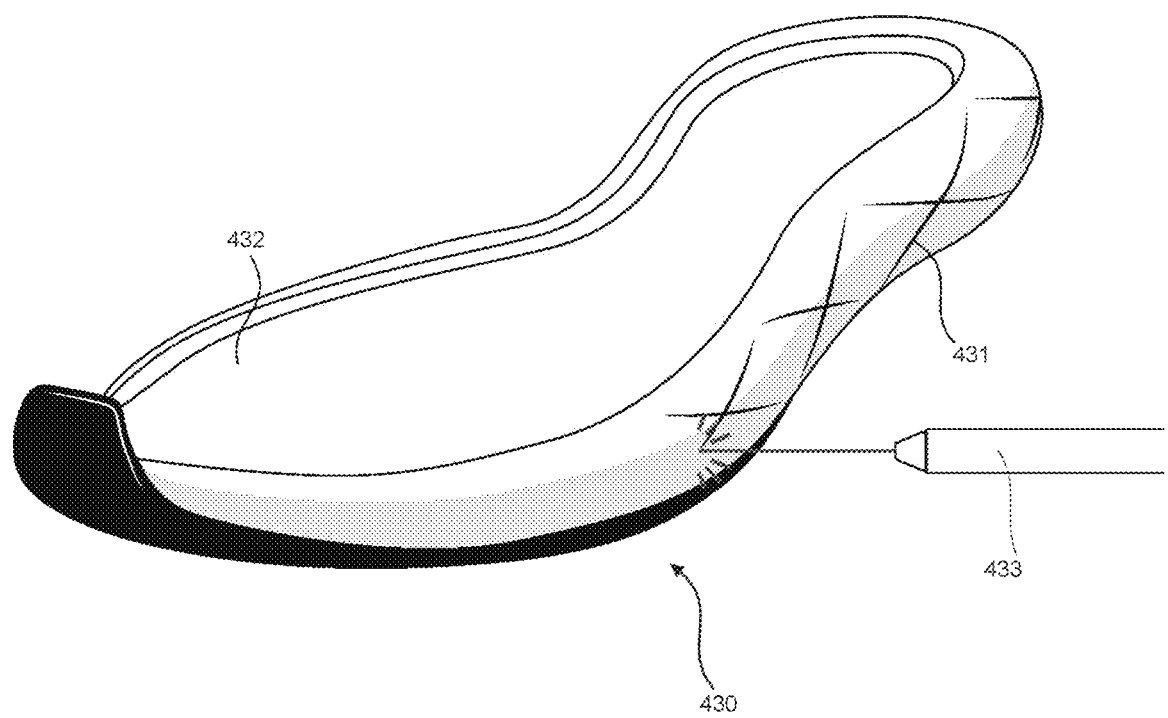
FIG. 25 shows a cutting operation on a layered foam sole according to some embodiments.
Figure 26:
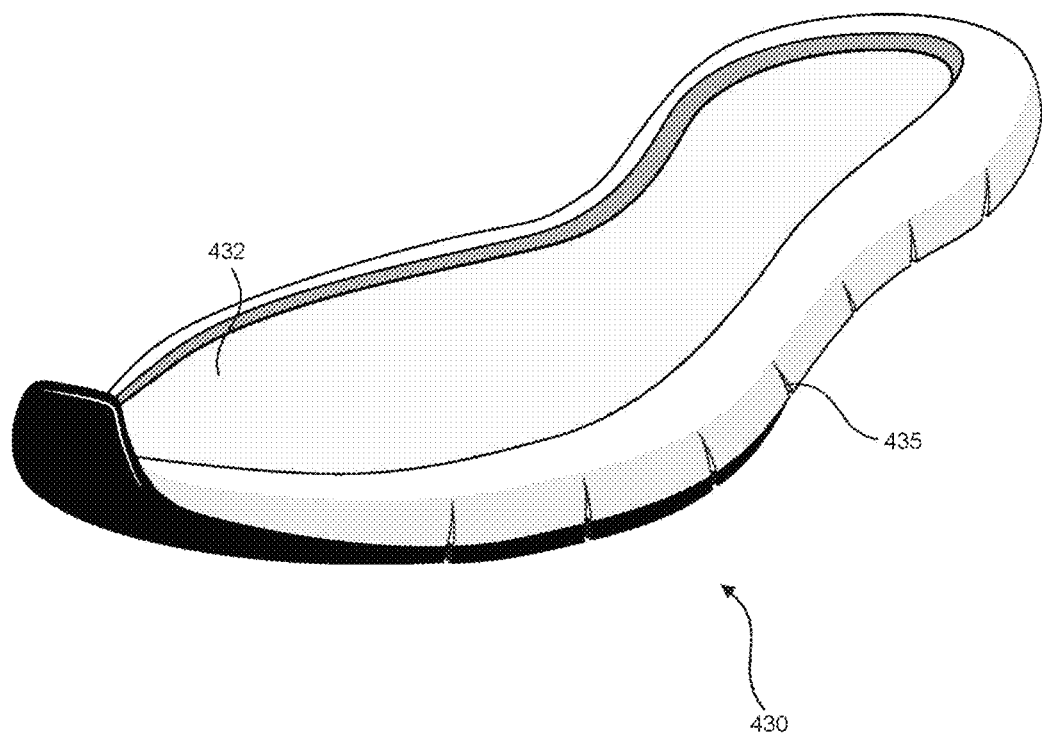
FIG. 26 shows a schematic of a layered foam sole according to some embodiments.

In some embodiments, outer edge of sole 430 is cut to form engravings 431, as shown in FIG. 25. Engravings 431 may be cut with a laser 433. In some embodiments, sole 430 may include flex grooves 435, as shown in FIG. 26.

Foam sections may be combined together in a mold to form a midsole. In some embodiments, the foam sections and layers are comolded in a single operation. In some embodiments, a layered foam midsole may be coupled with an outsole to form a complete sole. For example, a layered foam midsole comprising polyether block amide may be coupled to a rubber outsole to form a sole for an article of footwear. In some embodiments, other components (such as a rim or a rubber outsole) are comolded with the foam sections and layers in a single operation.

Figure 27:
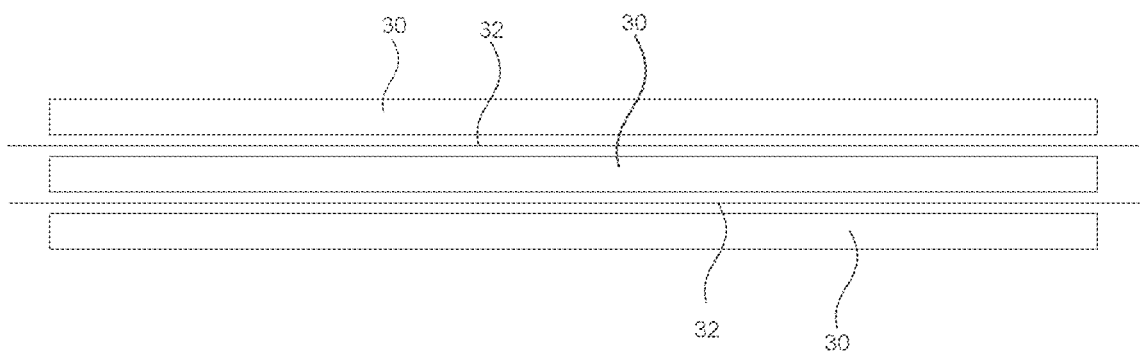
FIG. 27 shows a schematic of a layered foam sole according to some embodiments.
Figure 28:
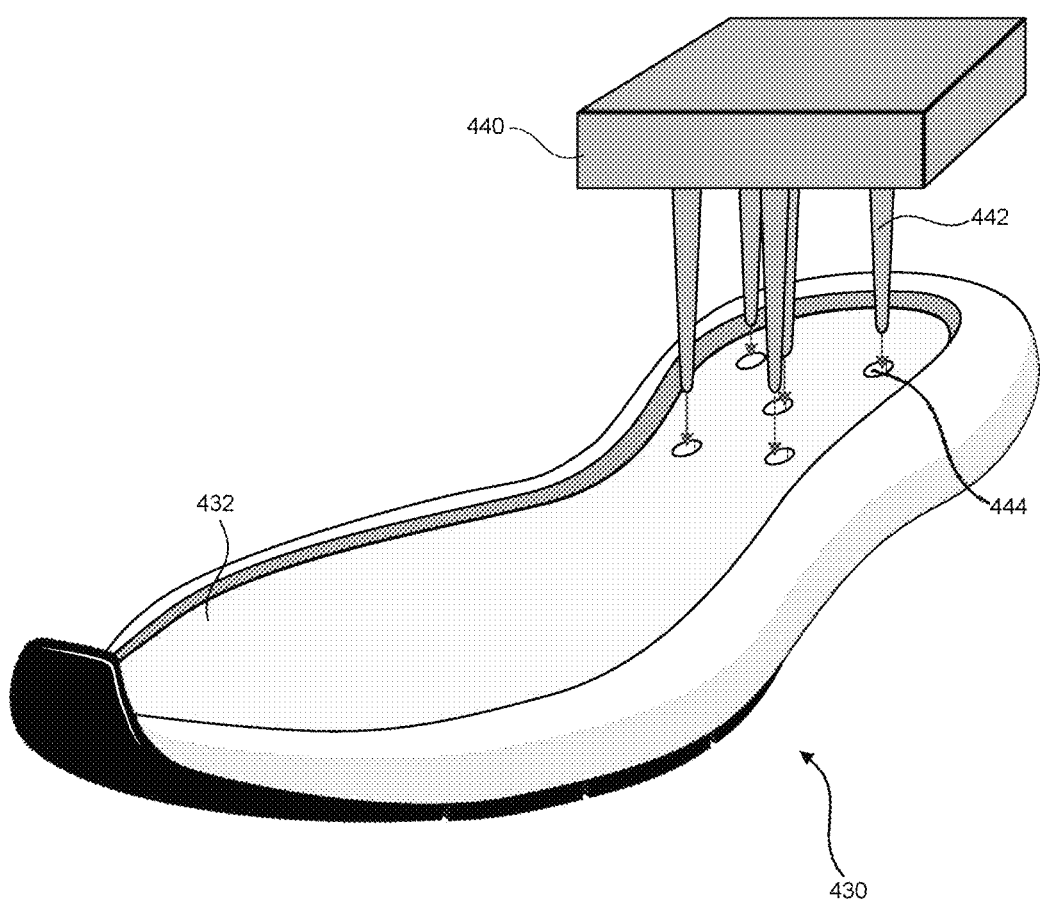
FIG. 28 shows a schematic of an apparatus to facilitate bonding of layers to form a layered foam sole according to some embodiments.

In some embodiments, each foam section is bonded to an adjacent foam section with a hot melt adhesive. For example, as shown in FIG. 27, a hot melt adhesive 32 is disposed between each foam section 30 to form a layered foam sole. In some embodiments, no adhesive is used to bond foam sections together to form a midsole. In some embodiments, heat and pressure from the molding process bonds foam sections together. In some embodiments, the molding process provides heat specifically to the interface between adjacent foam sections to improve the bond between adjacent foam sections. For example, as shown in FIG. 28, sole 430 may be made with layered foam portion 432 by using a heating apparatus 440 during the molding process. Apparatus 440 may comprise one or more pins 442 that pierce foam sections, forming holes 444 and delivering heat to the interface between adjacent foam sections. In some embodiments, holes 444, rather than being formed by pins 442 piercing foam sections, may be present in layered foam portion 432 prior to insertion of pins 442. In some embodiments, holes 444 do not extend all the way through layered foam portion 432. In some embodiments, the amount of penetration into layered foam portion 432 may depend on the size of pins 442. In some embodiments, the amount of penetration depends on the stacked layers of layered foam portion 432. In some embodiments, holes 444 remain in the foam sections after sole 430 is made. In some embodiments, the additional heat at the interface melts the foam appropriately to facilitate the bond between adjacent foam sections. In some embodiments, pins 442 may also extract heat from layered foam portion 432 (e.g., to cure the melted portion of foam sections so that they bond together).

Figure 29:
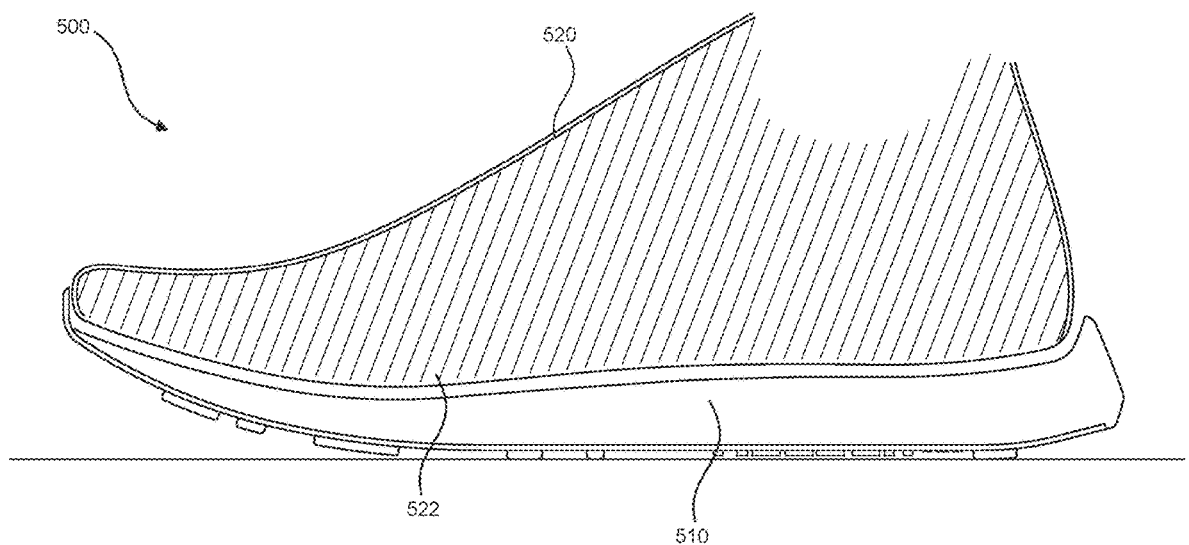
FIG. 29 shows a schematic of an article of footwear with a layered foam sole according to some embodiments.
Figure 30:
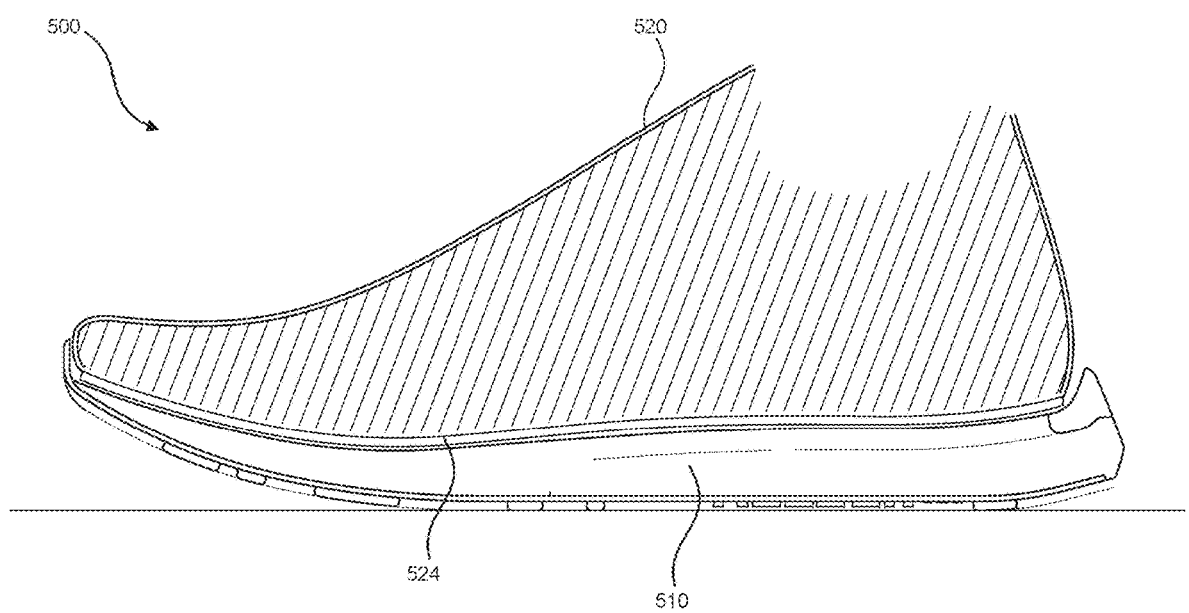
FIG. 30 shows a schematic of an article of footwear with a layered foam sole according to some embodiments.

In some embodiments, the layered foam soles discussed herein are coupled to an upper to form an article of footwear. For example, FIG. 29 shows article of footwear 500 with a sole 510 and an upper 520. Sole 510 may be any layered foam sole discussed herein. In some embodiments, upper 520 is a sock construction (e.g., made of a knit material 522), although other types of uppers may be used. In some embodiments, sole 510 is directly coupled to upper 520. For example, knit material 522 may directly couple to the polyether block amide foam of sole 510. In some embodiments, as shown, for example, in FIG. 30, sole 510 couples to a cushioned strobel 524, for example, by cementing. Other methods of coupling sole 510 to upper 520 may also be used.

Figure 31:
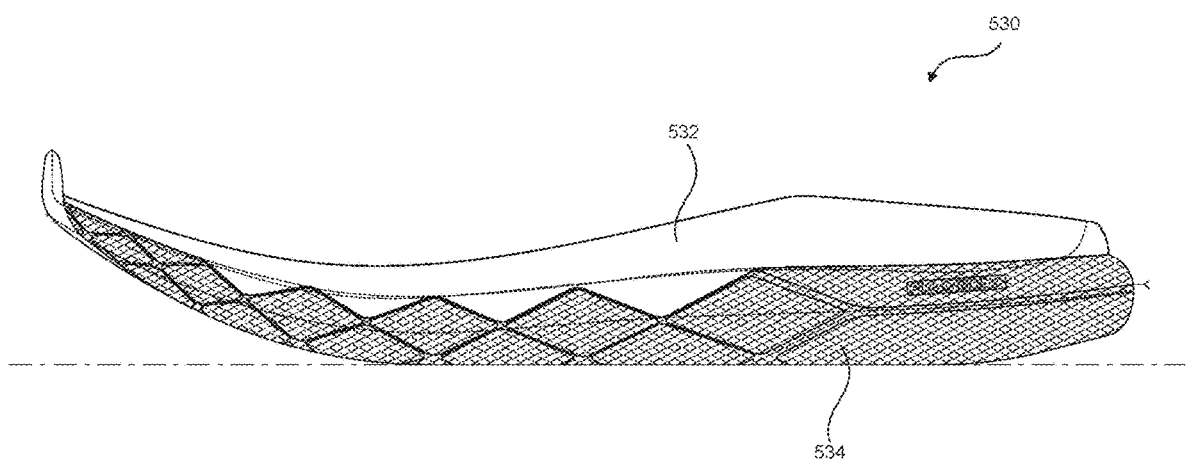
FIG. 31 shows a schematic of a layered foam sole according to some embodiments.
Figure 32:
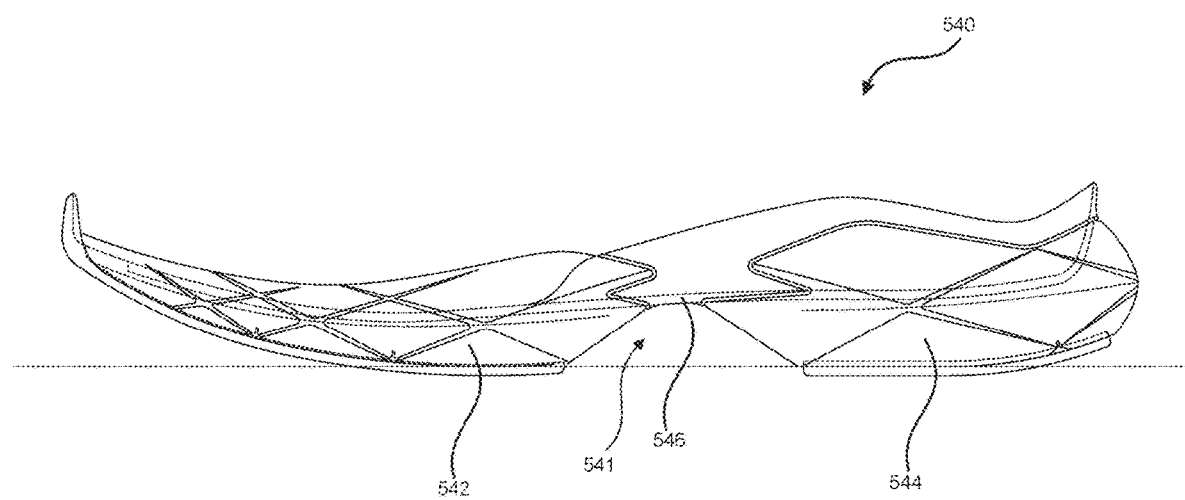
FIG. 32 shows a schematic of a layered foam sole according to some embodiments.
Figure 33:
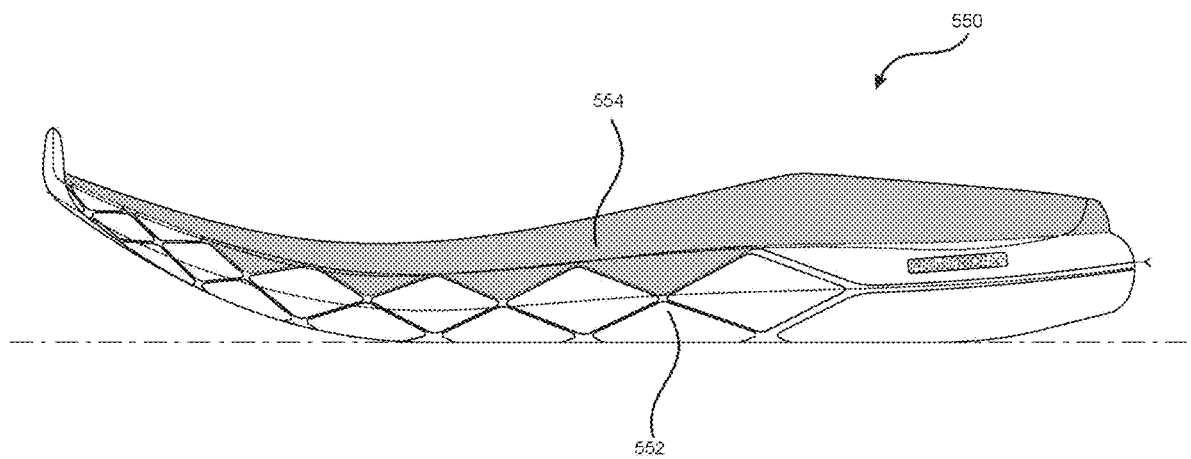
FIG. 33 shows a schematic of a layered foam sole according to some embodiments.
Figure 34:
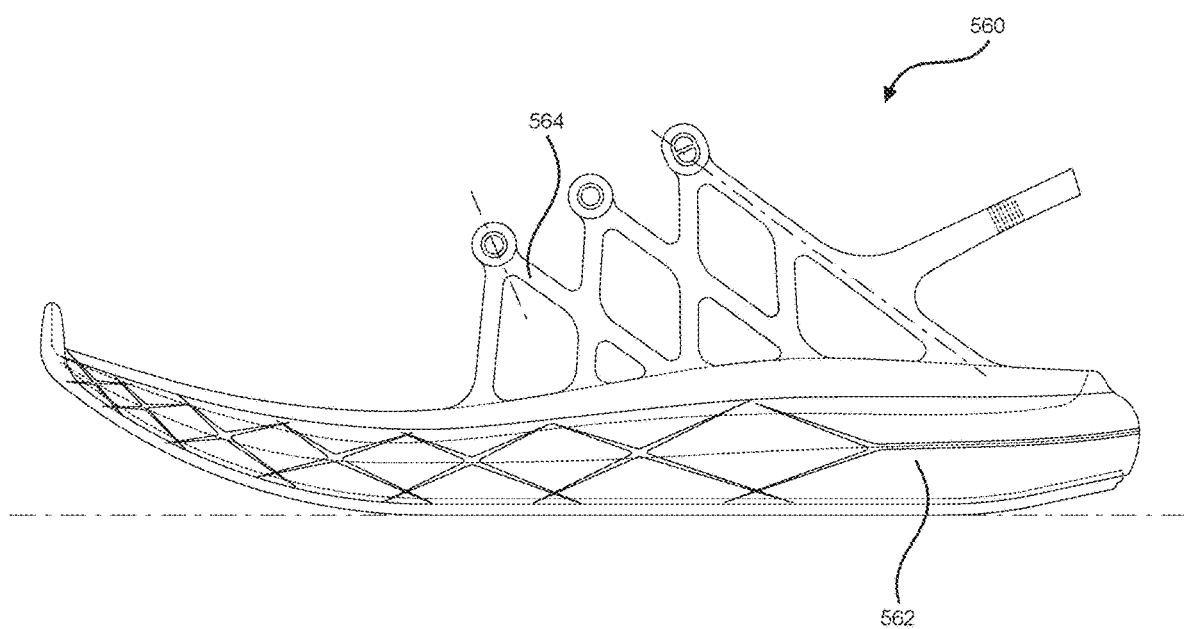
FIG. 34 shows a schematic of a layered foam sole according to some embodiments.

In some embodiments, layered foam sole may be textured on an exterior surface. For example, FIG. 31 shows sole 530 comprising a layered foam portion 532. An outer portion 534 of sole 530 is textured. In some embodiments, as shown in FIG. 32, a sole 540 comprises a first layered foam portion 542 and a second layered foam portion 544. First layered foam portion 542 and second layered foam portion 544 may both be coupled to a plate 546. In some embodiments, plate 546 comprises a thermoplastic polyurethane plate. In some embodiments, plate 546 comprises a polyether block amide plate. In some embodiments, there is a gap 541 between first layered foam portion 542 and second layered foam portion 544. In some embodiments, as shown in FIG. 33, a sole 550 comprises a layered foam portion 552. In some embodiments, sole 550 comprises a randing 554 coupled to layered foam portion 552. Randing 554 may serve as the interface between sole 550 and an upper to form an article of footwear. In some embodiments, randing 554 comprises a thermoplastic polyurethane randing. In some embodiments, as shown in FIG. 34, a sole 560 comprises a layered foam portion 562. In some embodiments, sole 560 comprises a cage 564 coupled to layered foam portion 562. In some embodiments, cage 564 provides support to an upper. In some embodiments, cage helps secure article of footwear to a wearer's foot. In some embodiments, cage 564 comprises a randing (similar to randing 554). In some embodiments cage 564 comprises a thermoplastic polyurethane cage.

Various embodiments described herein provide a layered foam sole for an article of footwear and methods for making a layered foam sole. The disclosed embodiments reduce the waste and improve manufacturing efficiencies of making articles of footwear. Further variations of the embodiments described above may also be provided.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of making a midsole for an article of footwear, the method comprising:
   forming a plurality of foam layers;
   arranging the plurality of foam layers in a mold;
   inserting pins into the plurality of foam layers; and
   delivering heat to an interface between adjacent foam layers of the plurality of foam layers via the pins to bond the plurality of foam layers together to form the midsole,
   wherein the plurality of foam layers are arranged in the mold before delivering heat to the interface between adjacent foam layers of the plurality of foam layers.

2. The method of claim 1, wherein the plurality of foam layers comprises different materials of foam.

3. The method of claim 1, wherein the plurality of foam layers comprises polyether block amide.

4. The method of claim 1, wherein the plurality of foam layers comprises horizontal layers.

5. The method of claim 1, wherein the plurality of foam layers comprises vertical layers.

6. The method of claim 1, wherein the plurality of foam layers alternates between a polyether block amide foam layer and an ethyl vinyl acetate foam layer.

7. The method of claim 1, wherein the plurality of foam layers bonds together without an adhesive.

8. The A method of making a midsole for an article of footwear claim 1, the method comprising:
forming a plurality of foam layers;
arranging the plurality of foam layers in a mold;
inserting pins into the plurality of foam layers;
delivering heat to an interface between adjacent foam layers of the plurality of foam layers via the pins to bond the plurality of foam layers together to form the midsole; and
using the pins to extract heat from the plurality of foam layers to cure a melted portion of the plurality of foam layers.

9. The method of claim 1, wherein at least one foam layer of the plurality of foam layers comprises expanded polyether block amide beads fused together.

10. The method of claim 1, wherein inserting the pins into the plurality of foam layers comprises piercing the plurality of foam layers to form holes.

11. The method of claim 10, wherein the holes remain in the plurality of foam layers after forming the midsole.

12. A method of making a midsole for an article of footwear, the method comprising:
forming a plurality of foam layers;
arranging the plurality of foam layers in a mold;
inserting pins into the plurality of foam layers; and
delivering heat to an interface between adjacent foam layers of the plurality of foam layers via the pins to bond the plurality of foam layers together to form the midsole,
wherein holes are present in the plurality of foam layers prior to inserting the pins, and wherein inserting the pins into the plurality of foam layers comprises inserting the pins into the holes.

13. The method of claim 12, wherein the holes remain in the plurality of foam layers after forming the midsole.

14. The method of claim 1, wherein each of the plurality of foam layers comprises a plurality of foam sections.

15. A method of making a midsole for an article of footwear, the method comprising:
forming a plurality of foam layers;
arranging the plurality of foam layers in a mold;
piercing the plurality of foam layers with pins; and
using the pins to introduce heat at an interface between adjacent foam layers of the plurality of foam layers to bond the plurality of foam layers together to form the midsole,
wherein the plurality of foam layers alternates between a polyether block amide foam layer and an ethyl vinyl acetate foam layer.

16. The method of claim 15, further comprising using the pins to extract heat from the plurality of foam layers to cure a melted portion of the plurality of foam layers.

17. The method of claim 15, wherein at least one foam layer of the plurality of foam layers comprises expanded polyether block amide beads fused together.

18. The method of claim 15, wherein piercing the plurality of foam layers with pins forms holes in the plurality of foam layers, and wherein the holes remain in the plurality of foam layers after forming the midsole.

19. The method of claim 15, wherein each of the plurality of foam layers comprises a plurality of foam sections.

20. The method of claim 15, wherein the plurality of foam layers bonds together without an adhesive.

* * * * *

UNITED STATES PATENT AND TRADEMARK OFFICE
CERTIFICATE OF CORRECTION

| | |
|---|---|
| PATENT NO. | : 11,109,642 B2 |
| APPLICATION NO. | : 16/143991 |
| DATED | : September 7, 2021 |
| INVENTOR(S) | : Montross et al. |

It is certified that error appears in the above-identified patent and that said Letters Patent is hereby corrected as shown below:

In the Claims

In Column 11, Claim 8, Line 8, delete "The A" and insert --A--, therefor.

In Column 11, Claim 8, Line 9, delete "footwear claim 1," and insert --footwear,--, therefor.

Signed and Sealed this
Third Day of May, 2022

Katherine Kelly Vidal
*Director of the United States Patent and Trademark Office*